(12) United States Patent
Lee

(10) Patent No.: US 12,197,191 B2
(45) Date of Patent: Jan. 14, 2025

(54) PROGRAMMABLE CONTROLLER, DATA LOGGING METHOD, AND RECORDING MEDIUM

(71) Applicant: Mitsubishi Electric Corporation, Tokyo (JP)

(72) Inventor: Weihau Lee, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/574,317

(22) PCT Filed: Jul. 20, 2021

(86) PCT No.: PCT/JP2021/027170
§ 371 (c)(1),
(2) Date: Dec. 27, 2023

(87) PCT Pub. No.: WO2023/002572
PCT Pub. Date: Jan. 26, 2023

(65) Prior Publication Data
US 2024/0264584 A1 Aug. 8, 2024

(51) Int. Cl.
*G05B 19/418* (2006.01)
*G06F 11/34* (2006.01)

(52) U.S. Cl.
CPC .... *G05B 19/41835* (2013.01); *G06F 11/3476* (2013.01); *G05B 2219/31001* (2013.01)

(58) Field of Classification Search
None
See application file for complete search history.

(56) References Cited

U.S. PATENT DOCUMENTS

| | | |
|---|---|---|
| 2012/0265838 A1 | 10/2012 | Nakano |
| 2020/0225632 A1 | 7/2020 | Nagata |
| 2022/0308548 A1 | 9/2022 | Okada et al. |
| 2023/0152771 A1 | 5/2023 | Wakahara |

FOREIGN PATENT DOCUMENTS

| | | |
|---|---|---|
| JP | H11-331766 A | 11/1999 |
| JP | 2019-135588 A | 8/2019 |
| JP | 2020-134984 A | 8/2020 |

(Continued)

OTHER PUBLICATIONS

International Search Report and Written Opinion mailed on Oct. 19, 2021, received for PCT Application PCT/JP2021/027170, filed on Jul. 20, 2021, 8 pages including English Translation.

(Continued)

*Primary Examiner* — Walter L Lindsay, Jr.
*Assistant Examiner* — Geoffrey T Evans
(74) *Attorney, Agent, or Firm* — XSENSUS LLP

(57) ABSTRACT

A programmable logic controller or a PLC includes a collector that repeatedly collects, from a device memory, a value varying depending on control of a device, a buffering device that stores, into a buffer, a set of data indicating the value collected at a timing corresponding to satisfaction of a buffering condition, and a logger that reads the set of data from the buffer upon a logging condition being satisfied and stores the set of data into a storage as a set of log data. The buffering device discards the set of data stored in the buffer upon another predetermined condition different from the buffering condition and the logging condition being satisfied.

17 Claims, 27 Drawing Sheets

(56) References Cited

FOREIGN PATENT DOCUMENTS

| | | | |
|---|---|---|---|
| JP | 6896195 | B1 | 6/2021 |
| WO | 2012/143993 | A1 | 10/2012 |
| WO | 2021/019615 | A1 | 2/2021 |

OTHER PUBLICATIONS

Decision to Grant mailed on Jun. 14, 2022, received for JP Application 2022-518860, 5 pages including English Translation.
Office Action issued Jul. 12, 2024 in corresponding Chinese Patent Application No. 202180100077.4.

PROGRAMMABLE CONTROLLER, DATA LOGGING METHOD, AND RECORDING MEDIUM

CROSS-REFERENCE TO RELATED APPLICATION

This application is a national stage application under 35 U.S.C. § 371 based on International Patent Application No. PCT/JP2021/027170, filed Jul. 20, 2021, the entire contents of which are incorporated herein by reference.

TECHNICAL FIELD

The present disclosure relates to a programmable controller, a data logging method, and a program.

BACKGROUND ART

At factory automation (FA) sites, a control device controls various devices to implement lines such as a production line, a processing line, and an inspection line. When a trouble occurs during the operation of a line, data indicating the control history is analyzed to identify the cause of the trouble. Techniques have been developed for logging data used in such control (see, for example, Patent Literature 1).

Patent Literature 1 describes a technique for recording time-series device values as log data in a temporary recorder when a first condition for a recording trigger is satisfied, and saving the log data stored in the temporary recorder serving as a ring buffer to a save memory when a second condition for a saving trigger is satisfied. With the technique, a saving trigger is input when a trouble occurs. The log data is thus used to identify the cause of the trouble.

CITATION LIST

Patent Literature

Patent Literature 1: Unexamined Japanese Patent Application Publication No. 2020-134984

SUMMARY OF INVENTION

Technical Problem

The technique in Patent Literature 1 records a large amount of log data in the temporary recorder when a long period elapses between a recording trigger being generated and the trouble and when multiple recording triggers are generated before the trouble occurs. Thus, without a temporary recorder of sufficient capacity, log data to be used for subsequent examination may be overwritten in the temporary recorder before a trouble actually occurs. This may increase the difficulty of identifying the cause of the trouble.

In response to the above circumstances, an objective of the present disclosure is to facilitate identification of the cause of a trouble.

Solution to Problem

To achieve the above objective, a programmable controller according to an aspect of the present disclosure is a programmable controller for controlling a device. The programmable controller includes collecting means for repeatedly collecting, from a memory, a value varying depending on control of the device, buffering means for storing, into a buffer, a set of data indicating the value collected by the collecting means at a timing corresponding to satisfaction of a predetermined buffering condition, and logging means for reading the set of data from the buffer upon a predetermined logging condition being satisfied and for storing the set of data into storage means as a set of log data. The buffering means discards the set of data stored in the buffer upon another predetermined condition different from the buffering condition and the logging condition being satisfied.

Advantageous Effects of Invention

In the programmable controller according to the above aspect of the present disclosure, the buffering means discards the set of data stored in the buffer upon the other condition different from the buffering condition and the logging condition being satisfied. Upon the other condition being satisfied, the set of data stored in the buffer is reduced before being logged. The reduced data lowers the possibility of loss of data to be used for subsequent examination from the buffer. This facilitates identification of the cause of the trouble.

DESCRIPTION OF EMBODIMENTS

A programmable controller according to one or more embodiments of the present disclosure is described in detail below with reference to the drawings.

Embodiment 1

Figure 1:
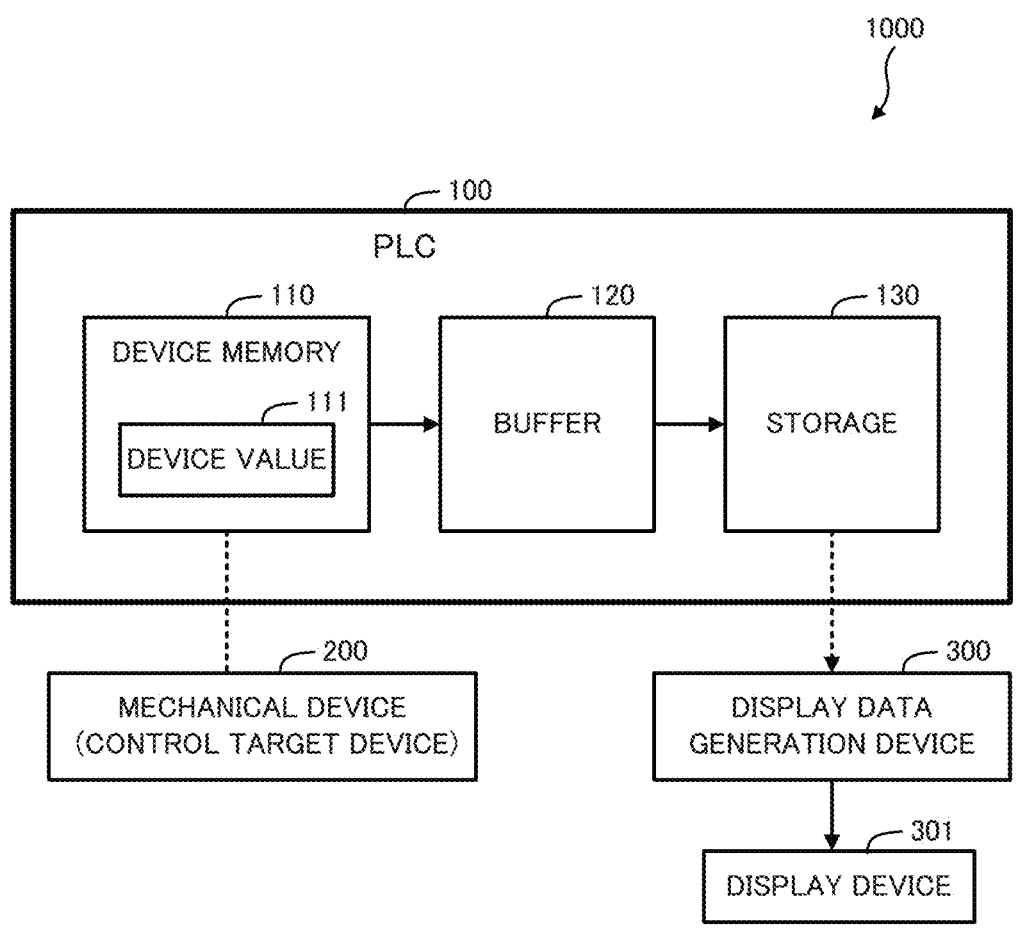
FIG. 1 is a diagram of a PLC system according to Embodiment 1, illustrating the structure.

FIG. 1 is a diagram of a programmable logic controller (PLC) system 1000 including a programmable controller according to the present embodiment. The PLC system 1000 is a control system corresponding to parts of a manufacturing system, an inspection system, and other processing systems installed at a facility such as a factory. In the PLC system 1000, a PLC 100 serving as the programmable controller activates a line by controlling a mechanical device 200 serving as a control target device connected with a communication line. The PLC 100 includes a device memory 110 for controlling the mechanical device 200, and a buffer 120 and a storage 130 for recording a log of a device value 111 stored in the device memory 110.

Device values 111 stored in the device memory 110 include a value synchronized with data stored in the mechanical device 200. For example, the PLC 100 reads a device value 111 to determine the state of the mechanical device 200 and rewrites a device value 111 to change the operation mode of the mechanical device 200. In addition to the value synchronized with the mechanical device 200, the device values 111 may include intermediate data used during computation by the PLC 100 for controlling the mechanical device 200, statistical data for managing the mechanical device 200, and other internal data. The mechanical device 200 is, for example, a sensor device, an actuator, a robot, or another factory automation (FA) device installed in the line.

The PLC 100 stores a log of the device value 111 into the storage 130 through the buffer 120. The buffer 120 is installed to accommodate the read-write speed difference between the device memory 110 and the storage 130. In the present embodiment, a part of data stored in the buffer 120 is discarded from the buffer 120 when a specific condition is satisfied without being written to the storage 130 for controlling logs to be stored into the storage 130. A log stored in the storage 130 is read by a display data generation device 300 connected to the PLC 100 with a communication line, and display data for identifying the cause of trouble is generated from the log. A display device 301 displays a display screen for a user based on the generated display data.

The display data generation device 300 and the display device 301 may be an industrial personal computer (PC) connected to the PLC 100 and an associated liquid crystal display (LCD) or may be a single tablet terminal combining the two devices. Although the display data generation device 300 is located outside the PLC 100 in FIG. 1, the display data generation device 300 may be a single unit included in a PLC 100 that is a building-block controller.

Figure 2:
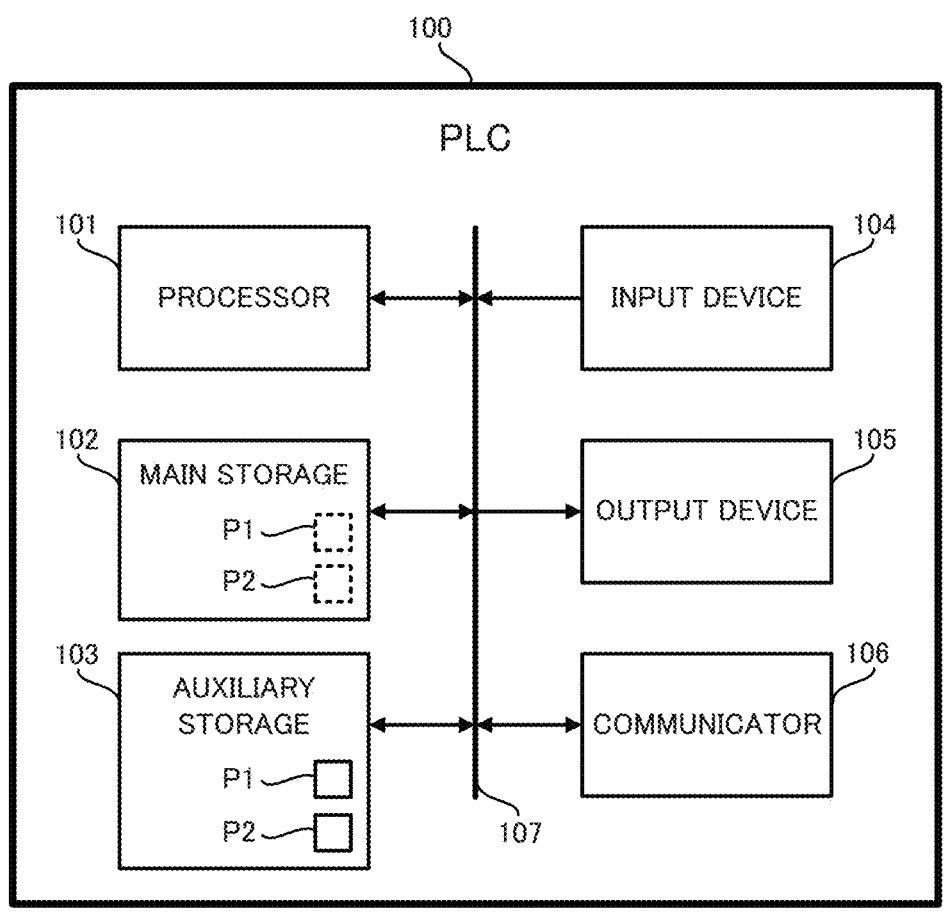
FIG. 2 is a diagram of a PLC in Embodiment 1, illustrating the hardware structure.

FIG. 2 schematically illustrates the hardware configuration of the PLC 100. As illustrated in FIG. 2, the PLC 100 includes a processor 101, a main storage 102, an auxiliary storage 103, an input device 104, an output device 105, and a communicator 106. The main storage 102, the auxiliary storage 103, the input device 104, the output device 105, and the communicator 106 are all connected to the processor 101 with an internal bus 107.

The processor 101 includes a central processing unit (CPU) or a micro processing unit (MPU). The processor 101 executes a program P1 stored in the auxiliary storage 103 to implement various functions and perform processing described later. The processor 101 also executes a control program P2 stored in the auxiliary storage 103 to control the mechanical device 200. The control program P2 may be, for example, a ladder program or an executable binary file generated from a source code written in a high-level language such as the C language.

The main storage 102 includes a random-access memory (RAM). The program P1 and the control program P2 are loaded from the auxiliary storage 103 into the main storage 102. The main storage 102 is used as a work area for the processor 101.

The auxiliary storage 103 includes a nonvolatile memory such as an electrically erasable programmable read-only memory (EEPROM) and a hard disk drive (HDD). The auxiliary storage 103 stores various sets of data used for processing in the processor 101 in addition to the program P1 and the control program P2. The auxiliary storage 103 provides data to be used by the processor 101 to the processor 101 as instructed by the processor 101. The auxiliary storage 103 stores data provided by the processor 101.

The input device 104 includes, for example, a hardware switch, an input key, or a pointing device. The input device 104 acquires information input by the user and provides the acquired information to the processor 101.

The output device 105 includes, for example, a light-emitting diode (LED), an LCD, or a speaker. The output device 105 presents various items of information to the user as instructed by the processor 101.

The communicator 106 includes a network interface circuit for communicating with an external device. The communicator 106 receives a signal from the external device and outputs data indicated by the signal to the processor 101. The communicator 106 also transmits a signal indicating data output from the processor 101 to the external device.

When the PLC 100 is a building-block programmable controller, the units included in the PLC 100 may include some or all of the hardware components illustrated in FIG. 2 and be connected to one another with a system bus.

Figure 3:
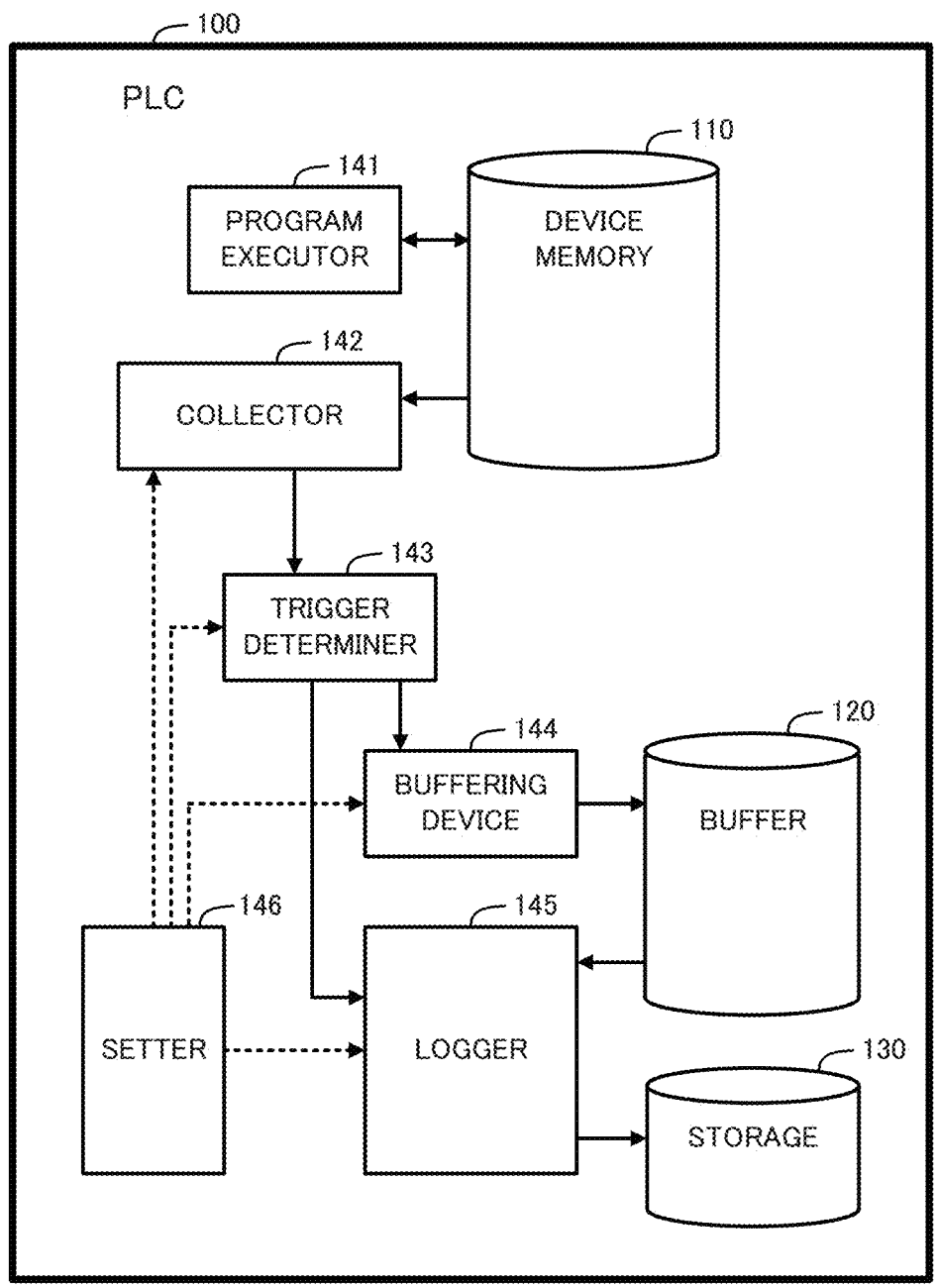
FIG. 3 is a functional block diagram of the PLC in Embodiment 1.

The above hardware components cooperating with one another allow the PLC 100 to implement the function of logging the device value 111. More specifically, as illustrated in FIG. 3, the PLC 100 includes, as its functional components, a program executor 141 that executes the control program P2, the device memory 110 that stores the device value 111 varying depending on control of the mechanical device 200, a collector 142 that repeatedly collects the device values 111 from the device memory 110, a trigger determiner 143 that determines the presence or absence of a trigger for storage of the log of the device value 111, a buffering device 144 that stores data indicating the collected device values 111 into the buffer 120, the buffer 120 that temporarily stores data, a logger 145 that reads data from the buffer 120 and stores the data into the storage 130 as log data, the storage 130 that stores log data, and a setter 146 that sets various parameters.

The program executor 141 is mainly implemented by the processor 101. The program executor 141 repeatedly executes the procedure defined in the control program P2 to control the mechanical device 200 using the device values 111 stored in the device memory 110.

The device memory 110 is mainly implemented by the main storage 102. Data in the device memory 110 varies as the program executor 141 executes the control program P2. For example, the execution of the control program P2 causes periodical acquisition and update of a value indicating sensing results from the mechanical device 200 serving as a sensor device. The execution of the control program P2 also causes a value indicating the rotation angle of a step motor included in the mechanical device 200 serving as an actuator to be updated when the mechanical device 200 is to be instructed to operate.

The collector 142 is mainly implemented by the processor 101. The collector 142 repeatedly reads the device value 111 stored in an area of the address predefined in the device memory 110 in every predetermined period, and outputs the read device value 111 to the trigger determiner 143. The predetermined period is, for example, a scan time corresponding to one execution of the control program P2 by the program executor 141. The device value 111 is, for example, a value indicated by 16-bit word data. The scan time has a length of, for example, 100 microseconds, 10 milliseconds, or 1000 milliseconds. The collector 142 corresponds to an example of collecting means for collecting a value from a memory in the PLC 100, and the device memory 110 corresponds to an example of the memory from which the collecting means collects data.

The trigger determiner 143 is mainly implemented by the processor 101. The trigger determiner 143 determines whether three conditions are satisfied. More specifically, the trigger determiner 143 determines whether a buffering condition for storing data indicating the device values 111 into the buffer 120 is satisfied. The trigger determiner 143 also determines whether a logging condition for storing data from the buffer 120 into the storage 130 is satisfied. The trigger determiner 143 further determines whether a canceling condition for discarding the data stored in the overall area of the buffer 120 to free the area and reserve an area for storing new data is satisfied.

The buffering condition, the logging condition, and the canceling condition are preset by the setter 146. The buffering condition, the logging condition, and the canceling condition are different from one another and satisfied by, for example, a change from the off state to the on state of a specified bit value of the device value 111 to be collected or a device value 111 not to be collected, detection of the duration of a bit value in the on state exceeding a threshold, detection of multiple bit values entering the on state in a specified order, determination that a condition for the numerical value indicated by a device value 111 is satisfied after being unsatisfied, or a combination of these. The buffering condition, the logging condition, and the canceling condition may be other conditions. For example, the buffering condition, the logging condition, and the canceling condition may be satisfied by the reception of a trigger signal from outside the PLC 100.

The trigger determiner 143 outputs the device values 111 collected by the collector 142 to the buffering device 144. When determining that at least one of the buffering condition or the canceling condition is satisfied, the trigger determiner 143 notifies the buffering device 144 that at least one of the buffering condition or the canceling condition is satisfied. When determining that the logging condition is satisfied, the trigger determiner 143 notifies the logger 145 that the logging condition is satisfied.

Figure 4:
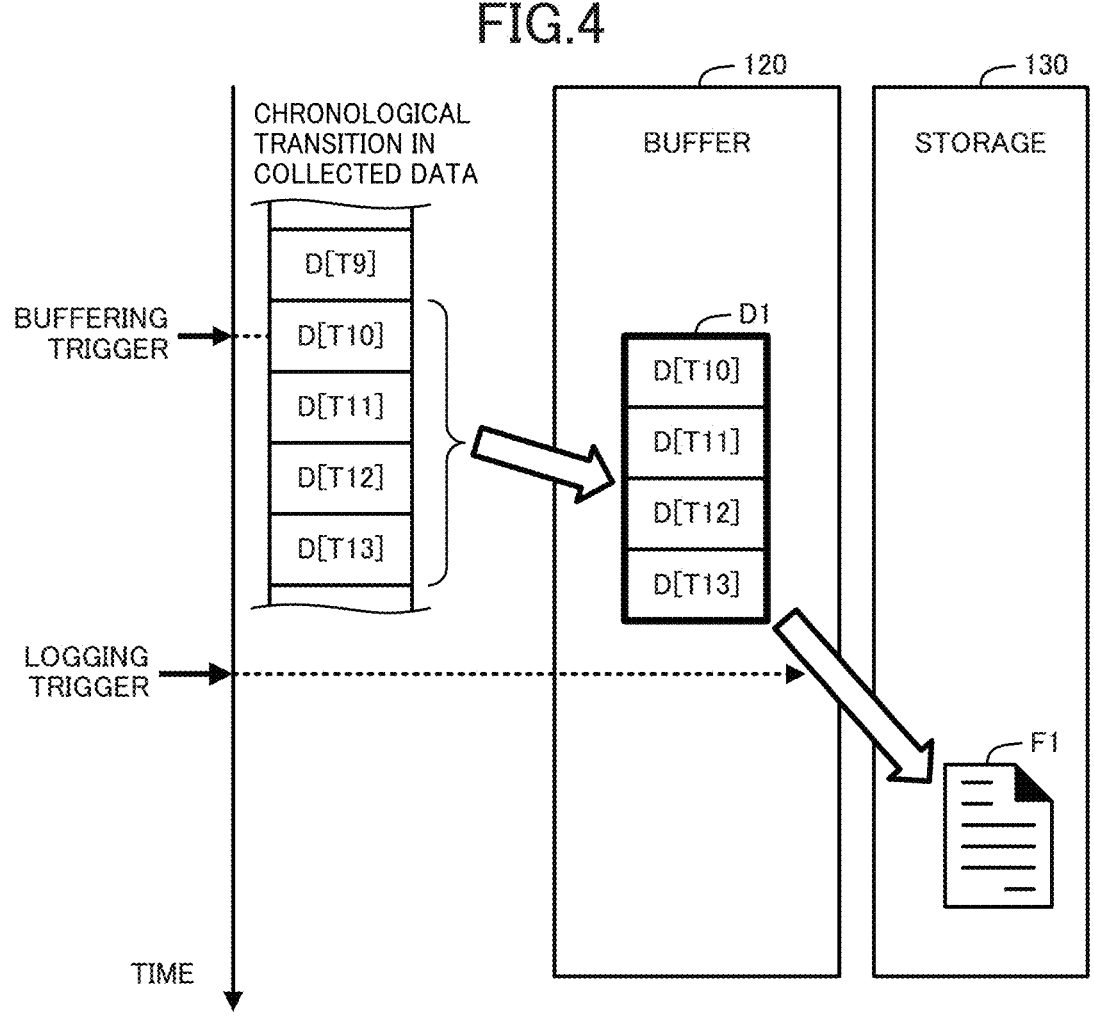
FIG. 4 is a diagram illustrating an overview of data buffering and logging in Embodiment 1.

The buffering device 144 is mainly implemented by the processor 101. When the buffering condition is satisfied, the buffering device 144 stores data indicating the device values 111 output from the trigger determiner 143 into the buffer 120. More specifically, as illustrated in FIG. 4, when a buffering trigger is generated at the timing data D[T10] is collected, the buffering device 144 stores, into the buffer 120, data D1 including data D[T10], D[T11], D[T12], and D[T13] collected during a specified period having a predetermined length from when the buffering trigger is generated. The data D[T10] indicates the value at time T10 of the device value 111 varying as the time elapses from T10, T11, . . . . The generation of a buffering trigger corresponds to the determination that the buffering condition is satisfied and the notification of the affirmative determination result to the buffering device 144. The length of the specified period is equivalent to, for example, 10 or 100 times the scan time. The buffering device 144 corresponds to an example of buffering means for storing data indicating values collected by the collector 142 into the buffer when the predetermined buffering condition is satisfied.

The buffer 120 is mainly implemented by the main storage 102. The buffer 120 may be a first-input-first-output (FIFO) ring buffer or a storage device in any other format. The buffer 120 in the present embodiment has a capacity larger than the size of the data D1 stored by the buffering device 144 per satisfaction of the buffering condition and smaller than the capacity equivalent to twice the size. In the example in FIG. 5, when a new buffering trigger is generated, new data including data D[T17], D[T18], D[T19], and D[T20] corresponding to the new buffering trigger is to be stored into the buffer 120. In this state, the data D1 still remains in the buffer 120 instead of being stored into the storage 130. The buffer 120 has no free space enough to store the data D[T17] to D[T20]. The new data is thus discarded instead of being stored into the buffer 120.

Referring back to FIG. 3, the logger 145 is mainly implemented by the processor 101. The logger 145 verifies whether the logging condition is satisfied at predetermined fixed time intervals. When detecting satisfaction of the logging condition, the logger 145 reads data from the buffer 120 and stores the data into the storage 130 as log data. The storage 130 is mainly implemented by the auxiliary storage 103 or a removable memory card. The logger 145 corresponds to an example of logging means for storing log data into the storage 130 serving as storage means when the predetermined logging condition is satisfied.

Figure 5:
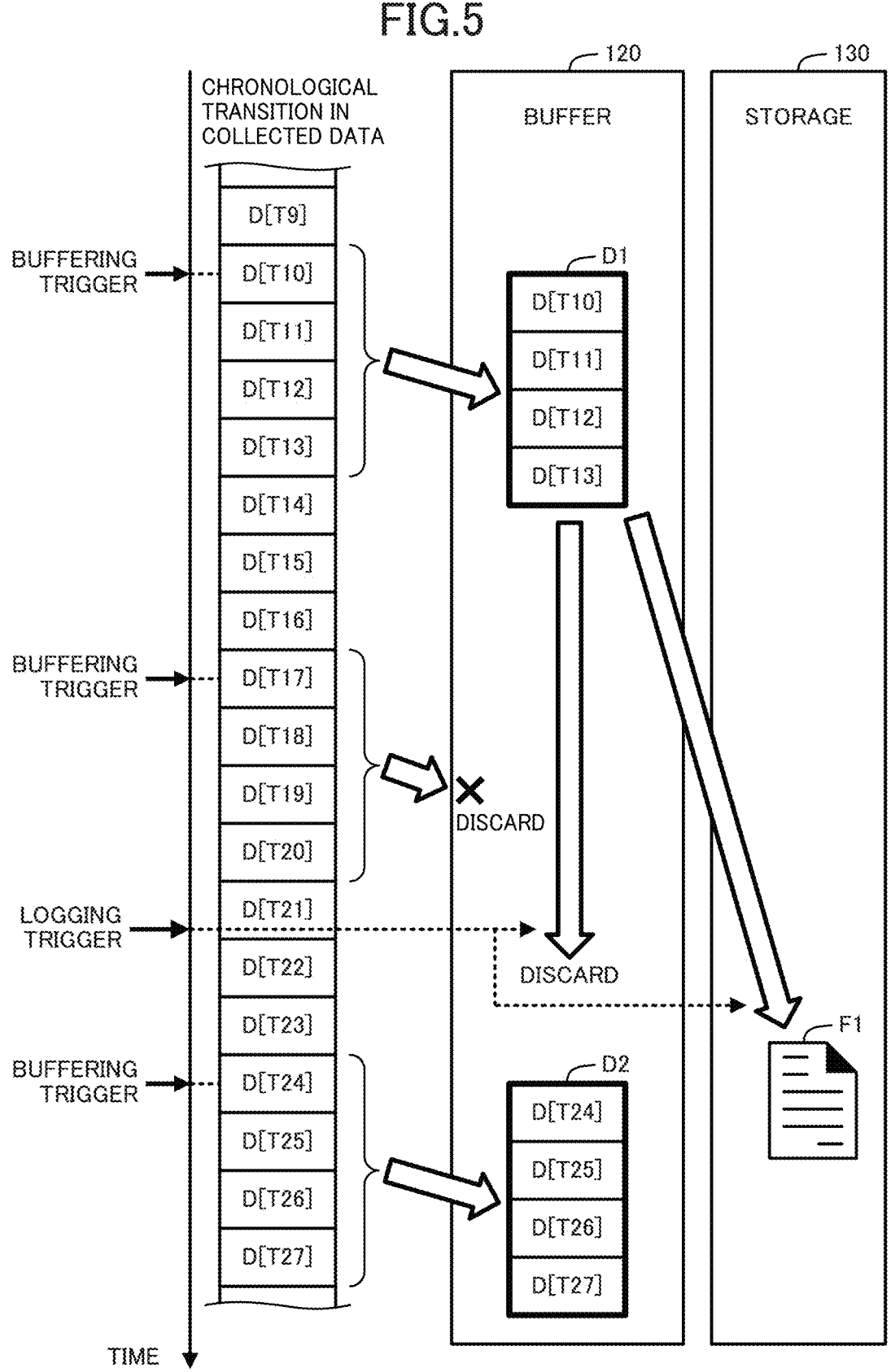
FIG. 5 is a diagram describing storage of data in a buffer in Embodiment 1.

In FIG. 5, when a logging trigger is generated, the logger 145 reads the data D1 from the buffer 120 and stores the data D1 into the storage 130 as a file F1 corresponding to log data. The generation of the logging trigger corresponds to the determination that the logging condition is satisfied and the notification of the affirmative determination result to the logger 145.

In the example in FIG. 5, the generation of the logging trigger also frees the entire area of the buffer 120. More specifically, when the logging condition is satisfied, the buffer 120 stops storing the data D1, allowing the buffering device 144 to write new data to the buffer 120. As illustrated in FIG. 5, the buffer 120 is freed. New data D2 corresponding to the generation of a buffering trigger after the generation of the logging trigger is stored into the buffer 120.

Figure 6:
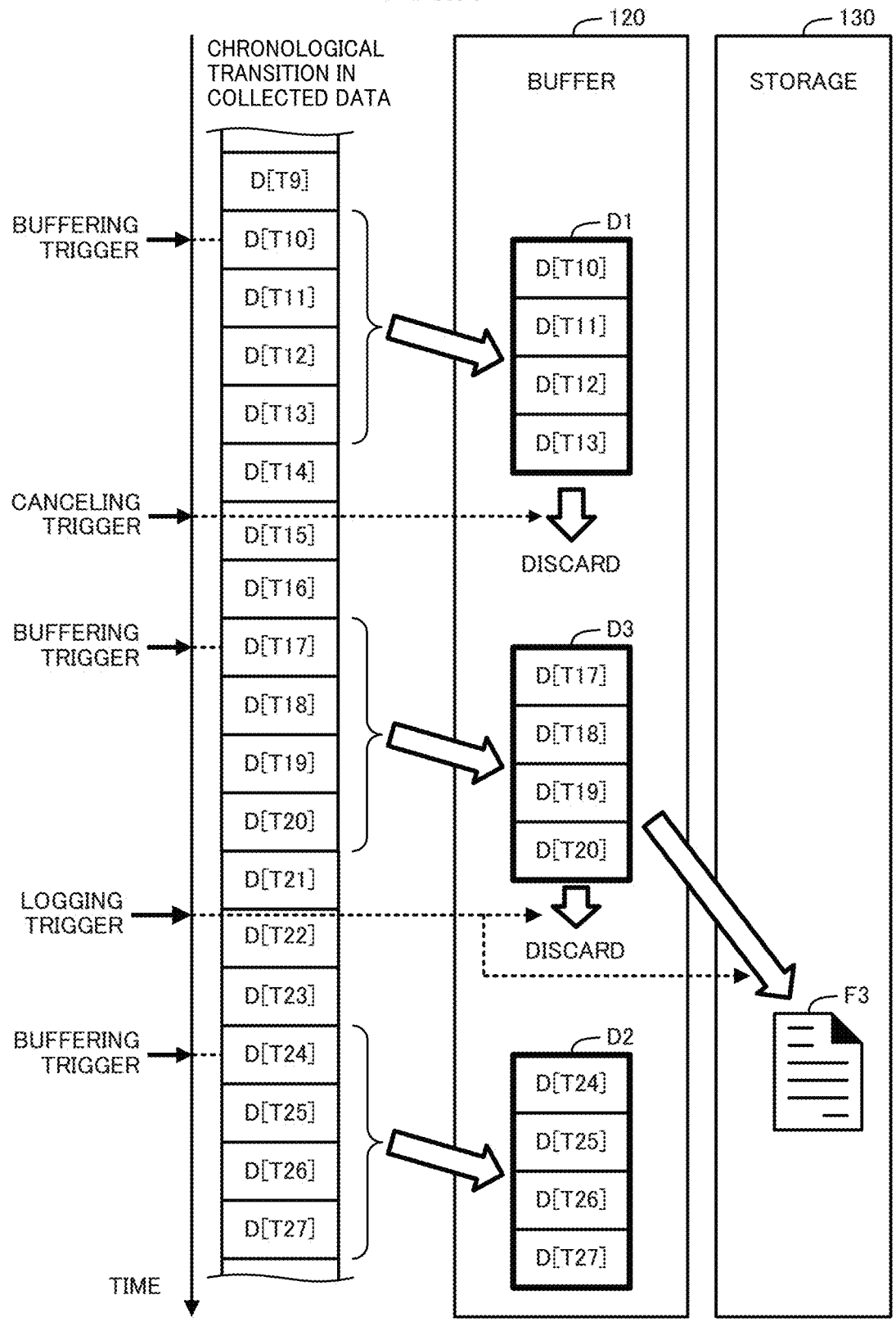
FIG. 6 is a diagram describing a canceling trigger in Embodiment 1.

However, although the logger 145 does not read the data D1 from the buffer 120, as illustrated in FIG. 6, the entire area of the buffer 120 is freed when a canceling trigger is generated, allowing new data to be stored. More specifically, when the canceling condition is satisfied, the buffering device 144 causes the buffer 120 to stop storing the data D1. The generation of the canceling trigger corresponds to the determination that the canceling condition is satisfied and the notification of the affirmative determination result to the buffering device 144.

Freeing the buffer 120 when the logging condition or the canceling condition is satisfied refers to discarding the data stored in the buffer 120 by excluding the data from logging targets. When the logging condition or the canceling condition is satisfied, the data in the buffer 120 may be erased, or changed to an overwritable state without being erased.

As illustrated in FIG. 6, when a canceling trigger is generated after the first buffering trigger is generated and before the second buffering trigger is generated, the canceling trigger cancels the buffering of the data D1 stored in the buffer 120. The second buffering trigger then causes data D3 including the data D[T17] to D[T20] to be stored into the buffer 120. When a logging trigger is generated after the second buffering trigger is generated and before the third buffering trigger is generated, a file F3 including the data D3 is stored into the storage 130, and the buffer 120 is freed. The freed buffer 120 then stores data D2 in response to the third buffering trigger. As illustrated in FIGS. 5 and 6, storing and discarding data temporarily stored in the buffer 120 before being stored into the storage 130 are controlled depending on whether a canceling trigger is generated.

Referring back to FIG. 3, the setter 146 is mainly implemented by the cooperation between the processor 101 and the input device 104. However, when a terminal serving as the user interface of the PLC 100 is connected to the PLC 100, the setter 146 may be implemented by the cooperation between the processor 101 and the communicator 106. The setter 146 acquires a parameter input by the user and sets the acquired parameter in the collector 142, the trigger determiner 143, the buffering device 144, and the logger 145. Parameters set by the setter 146 include an address in the device memory 110 for the device value 111 to be collected, periods for collecting the device values 111, the details of the buffering condition, the logging condition, and the canceling condition, and the length of the duration in which the device values 111 to be buffered is collected. The setter 146 sets the details of the canceling condition, and the user may use a canceling trigger to reduce the data stored temporarily in the buffer 120 before logging to the storage 130.

The processes performed by the PLC 100 are described in detail with reference to FIGS. 7 to 14.

Figure 7:
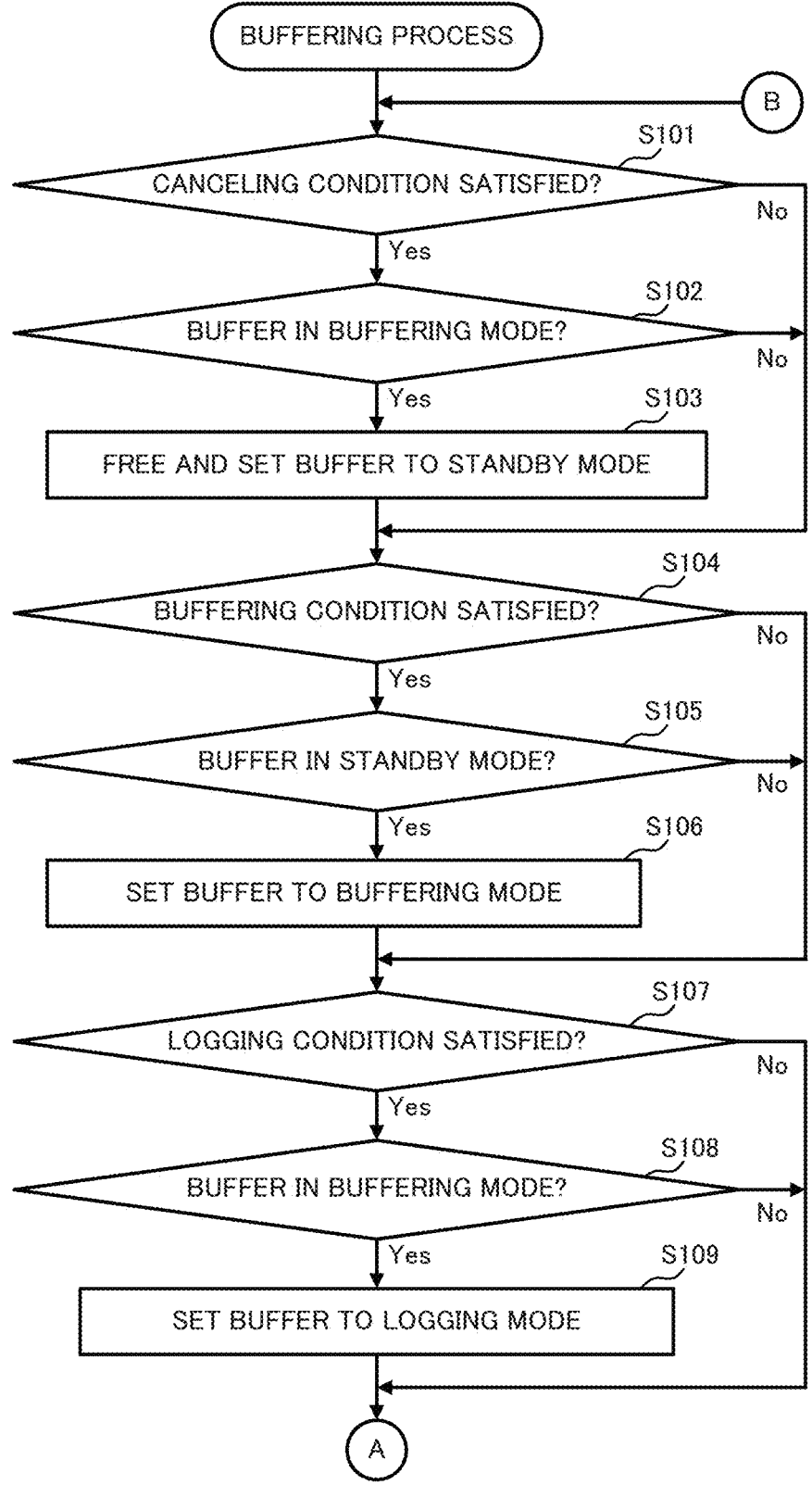
FIG. 7 is a first flowchart illustrating a buffering process in Embodiment 1.
Figure 8:
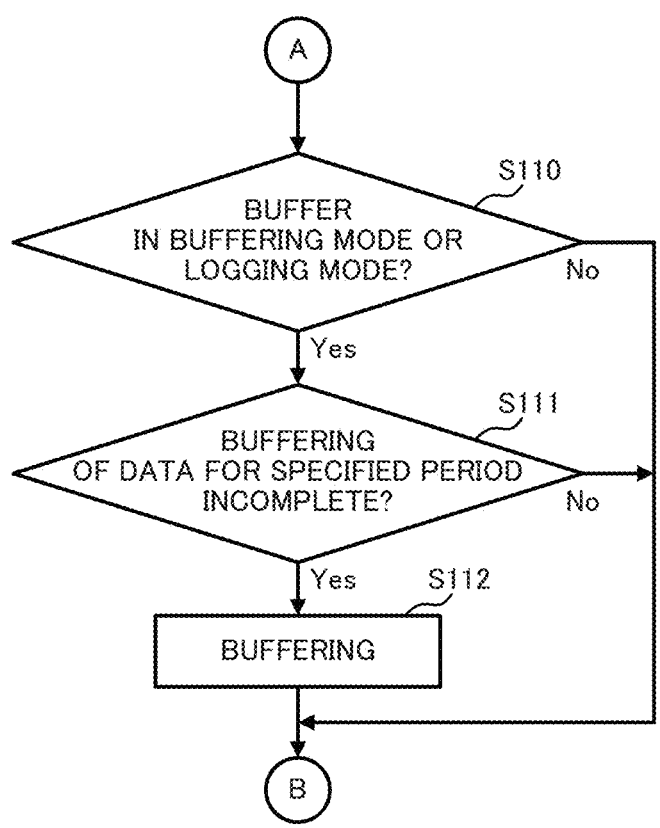
FIG. 8 is a second flowchart illustrating the buffering process in Embodiment 1.

FIGS. 7 and 8 illustrate the buffering process for the PLC 100 to store data into the buffer 120. In the buffering process, the above function of the PLC 100 is implemented based on the mode set in the buffer 120. The buffering process may be started at the same time as a specific application is executed upon a user operation or as the control program P2 is executed. The buffering process is repeated as described later based on the device value 111 collected by the collector 142. The buffering process is described below before the relationship between the mode set in the buffering process and the above function of the PLC 100 is described.

In the buffering process, the trigger determiner 143 determines whether the canceling condition is satisfied (step S101). When the canceling condition is determined to be satisfied (Yes in step S101), the buffering device 144 determines whether the current mode of the buffer 120 is the buffering mode (step S102). In the buffering mode, data starts being stored into the buffer 120, and the stored data is maintained. At the beginning of the buffering process, the buffer 120 is set to a standby mode, and thus the determination result in step S102 is negative. In the standby mode, the buffer 120 stores no data and is empty and waits for storage of data.

When the buffer 120 is determined to be in the buffering mode (Yes in step S102), the buffering device 144 frees the buffer 120 when the canceling condition is satisfied in step S101, and sets the buffer 120 to the standby mode (step S103). This allows new data to be stored into the buffer 120.

When the canceling condition is determined to be unsatisfied (No in step S101) or the buffer 120 is determined not to be in the buffering mode (No in step S102), the PLC 100 skips step S103 and advances the processing to step S104.

After step S103, the trigger determiner 143 determines whether the buffering condition is satisfied (step S104). When the buffering condition is determined to be satisfied (Yes in step S104), the buffering device 144 determines whether the buffer 120 is in the standby mode (step S105). More specifically, when the buffering condition is satisfied, the buffering device 144 determines whether data can be written to the buffer 120.

When the buffer 120 is determined to be in the standby mode (Yes in step S105), the buffering device 144 sets the buffer 120 to the buffering mode (step S106). This starts storage of data into the buffer 120.

When the buffering condition is determined to be unsatisfied (No in step S104) or the buffer 120 is determined not to be in the standby mode and data is determined to be prohibited from being written to the buffer 120 (No in step S105), the PLC 100 skips step S106 and advances the processing to step S107.

After step S106, the trigger determiner 143 determines whether the logging condition is satisfied (step S107). When the logging condition is determined to be satisfied (Yes in step S107), the buffering device 144 determines whether the buffer 120 is in the buffering mode (step S108). More specifically, when the logging condition is satisfied, the buffering device 144 determines whether data to be stored into the storage 130 is stored in the buffer 120.

When the buffer 120 is determined to be in the buffering mode (Yes in step S108), the buffering device 144 sets the buffer 120 to the logging mode (step S109). In the logging mode, data is output from the buffer 120. This starts reading of the data from the buffer 120.

When the logging condition is determined to be unsatisfied (No in step S107) or the buffer 120 is determined not to be in the buffering mode (No in step S108), the PLC 100 skips step S109 and advances the processing to step S110 in FIG. 8.

After step S109, as illustrated in FIG. 8, the buffering device 144 determines whether the buffer 120 is in the buffering mode or in the logging mode (step S110). When the buffer 120 is determined to be in the buffering mode or in the logging mode (Yes in step S110), the buffering device 144 determines whether buffering of data for a specified period to be stored into the buffer 120 is incomplete in the current buffering mode or in the current logging mode (step S111).

When the buffering is determined to be incomplete (Yes in step S111), the buffering device 144 stores the data into the buffer 120 (step S112). The PLC 100 repeats step S101 and subsequent steps illustrated in FIG. 7. When the buffer 120 is determined not to be in the buffering mode or in the logging mode (No in step S110) or the buffering is determined not to be incomplete (No in step S111), the PLC 100 skips step S112 and repeats step S101 and subsequent steps.

The above function of the PLC 100 is implemented by setting the mode of the buffer 120 as in the flowcharts illustrated in FIGS. 7 and 8. The implementation of the function is described with reference to FIGS. 9 to 13.

Figure 9:
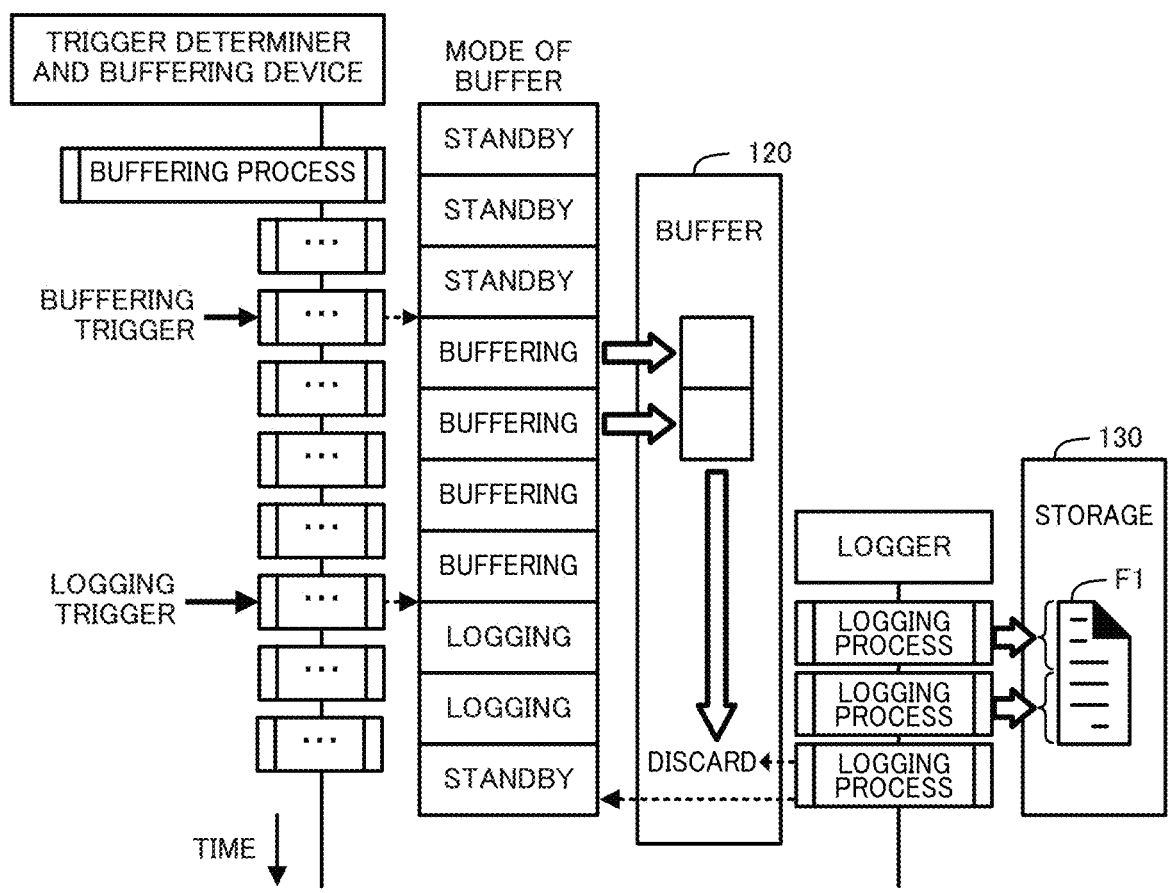
FIG. 9 is a first diagram describing the mode of the buffer in Embodiment 1.

In FIG. 9, the trigger determiner 143 and the buffering device 144 repeat the buffering process, and a buffering trigger is input in the third buffering process. The buffering trigger yields affirmative determination results in steps S104 and S105 in FIG. 7, thus setting the buffer 120 to the buffering mode in step S106. When the buffer 120 is set to the buffering mode, as illustrated in FIG. 9, data is stored into the buffer 120. When the data that has been acquired through the trigger determiner 143 is data corresponding to the specified period after the buffering trigger is generated, the buffering device 144 stores the data into the buffer 120. When storing of the data for the specified period into the buffer 120 is incomplete, or when the storing is complete and then each of the buffering condition, the logging condition, and the canceling condition is unsatisfied, the buffer 120 is set at the buffering mode as illustrated in FIG. 9.

Figure 10:
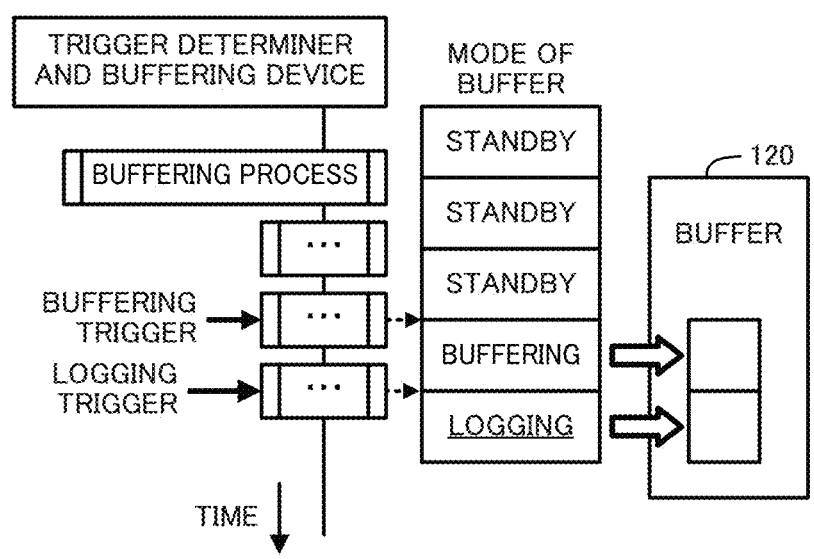
FIG. 10 is a second diagram describing the mode of the buffer in Embodiment 1.

In the example illustrated in FIG. 10, buffering of data for a specified period is incomplete, and a logging trigger is generated while the buffering device 144 is storing the data into the buffer 120. In this example, the buffer 120 is set at the logging mode, and the determination result in step S110 in FIG. 8 is affirmative. The buffering thus continues.

Figure 11:
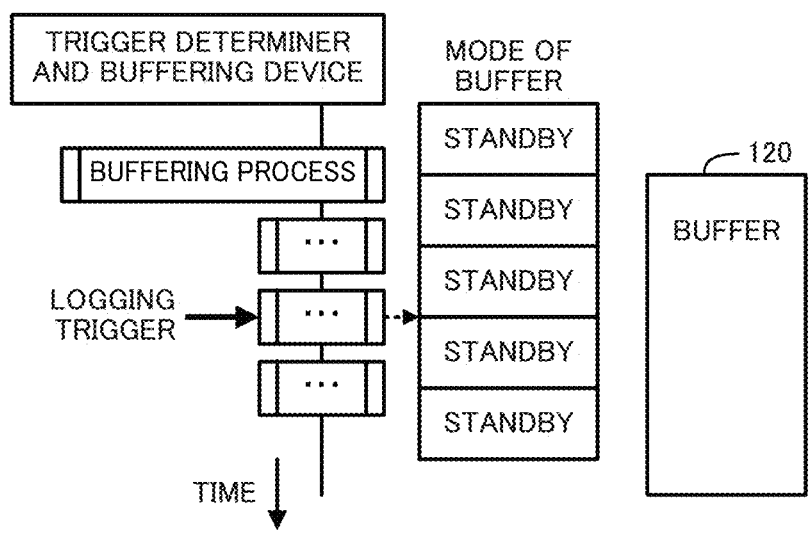
FIG. 11 is a third diagram describing the mode of the buffer in Embodiment 1.

In the example illustrated in FIG. 11, a logging trigger is generated when the buffer 120 stores no data. In this example, although the determination result in step S107 in FIG. 7 is affirmative, the determination result in step S108 is negative. The buffer 120 remains in the standby mode without mode switching.

Figure 12:
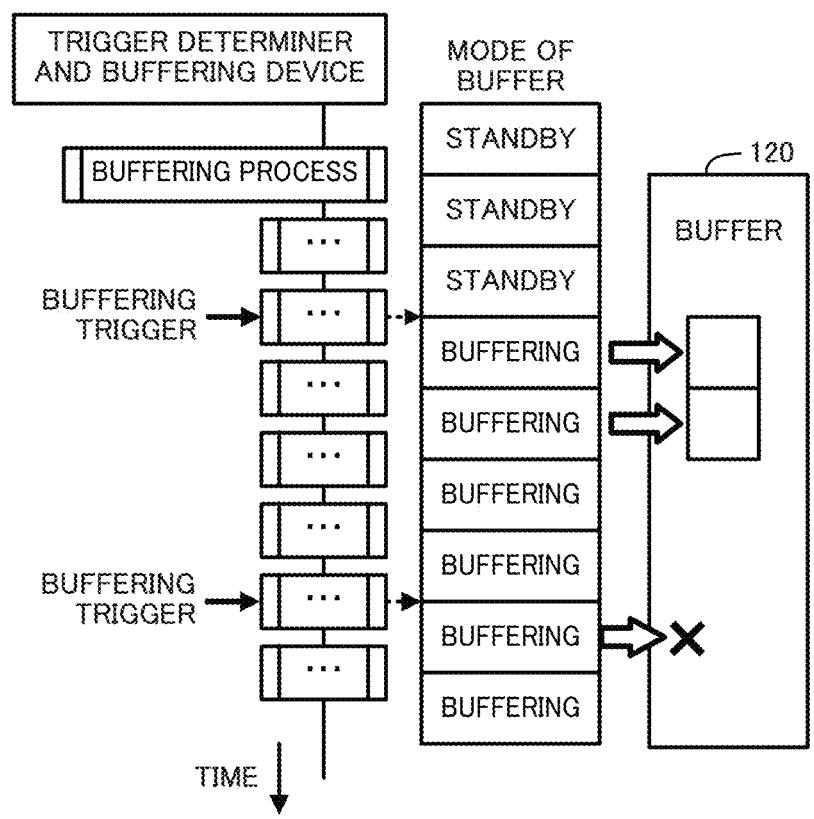
FIG. 12 is a fourth diagram describing the mode of the buffer in Embodiment 1.

In the example illustrated in FIG. 12, a logging trigger or a canceling trigger is not generated, and two buffering triggers are generated. In this example, the first buffering trigger causes data to be stored into the buffer 120. The buffer 120 remains in the buffering mode in the same manner as in the example in FIG. 9. When the second buffering trigger is generated, the determination result in step S104 in FIG. 7 is affirmative. However, the determination result in step S105 is negative. Step S106 is thus skipped. More specifically, the buffer 120 is not reset to the buffering mode, and storing of new data does not start. Thus, as illustrated in FIG. 12, the data corresponding to the second buffering trigger is discarded instead of being stored into the buffer 120. In this manner, as illustrated in FIG. 5, the second buffering trigger is ignored.

Figure 13:
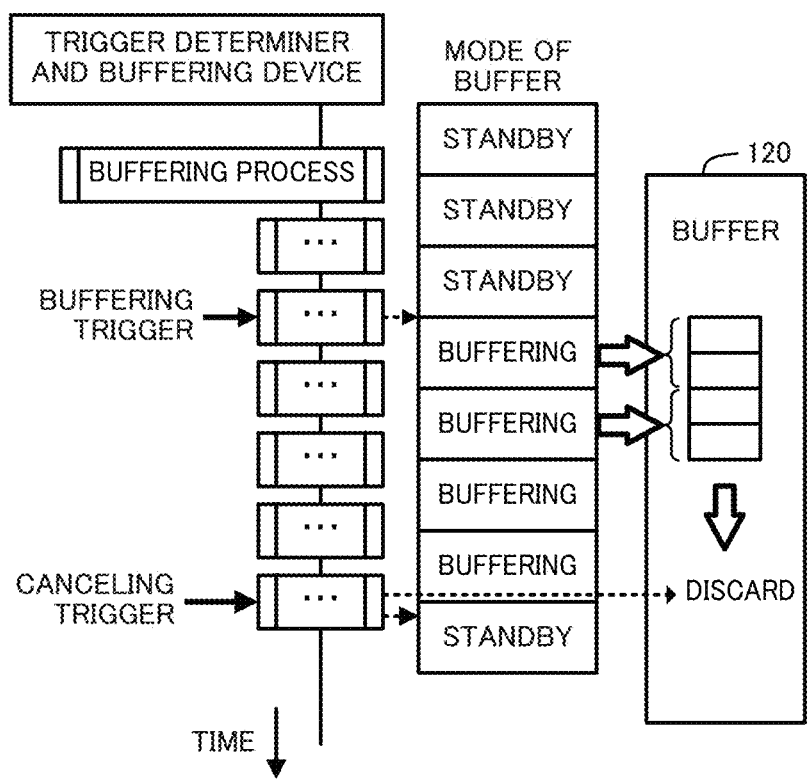
FIG. 13 is a fifth diagram describing the mode of the buffer in Embodiment 1.

In the example illustrated in FIG. 13, a canceling trigger is generated after a buffering trigger. When a canceling trigger is generated, the determination result in step S101 in FIG. 7 is affirmative, and also the determination result in step S102 is affirmative. Thus, the data stored in the buffer 120 is discarded, and the buffer 120 is set to the standby mode. The buffer 120 can store new data in the same manner as before the buffering trigger is generated. More specifically, as illustrated in FIG. 6, the buffer 120 is freed with the canceling trigger.

Figure 14:
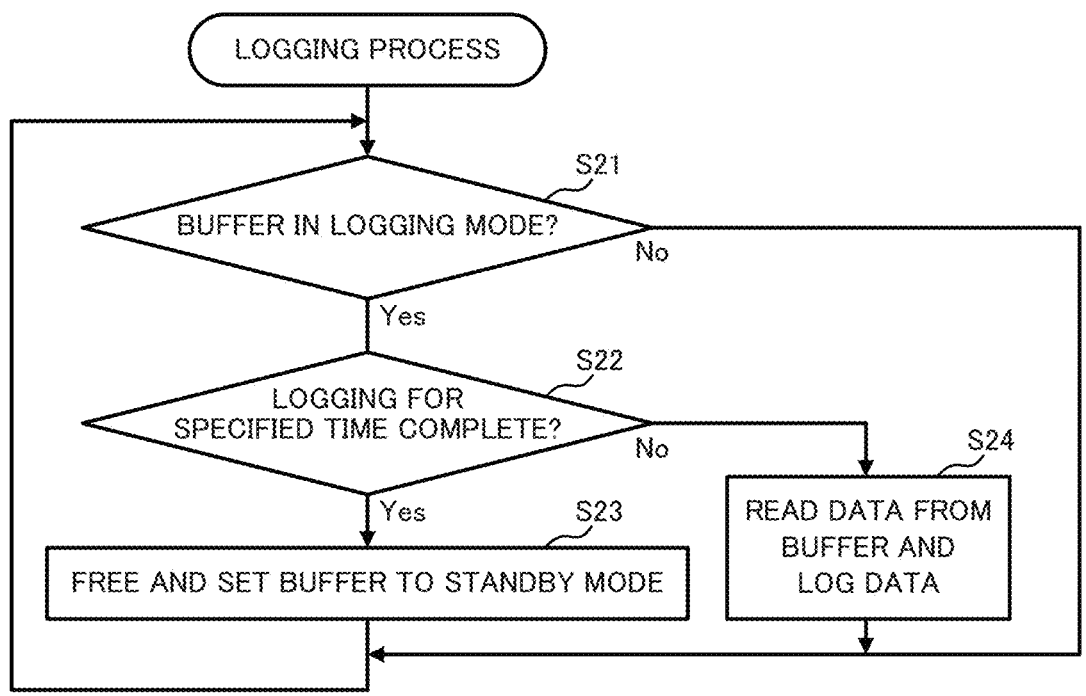
FIG. 14 is a flowchart illustrating a logging process in Embodiment 1.

The logging process performed by the logger 145 is described with reference to FIG. 14. The logging process is started at the same time as the buffering process.

In the logging process, the logger 145 determines whether the buffer 120 is in the logging mode (step S21). When the buffer 120 is determined not to be in the logging mode (No in step S21), the logger 145 repeats determination in step S21 and waits for the buffer 120 to be in the logging mode.

In contrast, when the buffer 120 is determined to be in the logging mode (Yes in step S21), the logger 145 determines whether logging for a specified time in the logging mode is complete (step S22). When the logging is determined to be complete (Yes in step S22), the logger 145 frees the buffer 120 and sets the buffer 120 to the standby mode (step S23). In this manner, as illustrated in FIG. 9, the buffer 120 is freed after the file F1 is stored into the storage 130. More specifically, as illustrated in FIGS. 5 and 6, the buffer 120 is freed in response to the logging trigger. The buffer 120 enters the standby mode and can store new data. The logger 145 then repeats step S21 and subsequent steps.

In contrast, when logging for a specified time is determined to be incomplete (No in step S22), the logger 145 reads the data from the buffer 120 and logs the data (step S24). More specifically, the logger 145 reads the data to be logged from the buffer 120 and stores the data into the storage 130. The logger 145 then repeats step S21 and subsequent steps.

As described above, when another predetermined canceling condition different from the buffering condition and the logging condition is satisfied, the buffering device 144 in the present embodiment discards the data stored in the buffer. Thus, when the canceling condition is satisfied, data stored in the buffer 120 is reduced before being logged into the storage 130. The reduced data lowers the possibility of loss of data to be used for subsequent examination from the buffer 120. This facilitates identification of the cause of a trouble.

In one example case, a polishing process implemented by the PLC 100 may include a roughing step, a grinding step, and a finishing step in this order. A buffering trigger is generated upon completion of each of the roughing step, the grinding step, and the finishing step, and a logging trigger is generated upon detection of an abnormality in an inspection process next to the polishing process. In this case, a defect derived from a workpiece to be polished is likely to be detected in the first roughing step, and data collected in the roughing step is to be relevant. In a specific example, abnormal frictional resistance in the roughing step may be reflected in the electric current value of a power source motor. Sign data on the cause of abnormality becomes smaller as the process advances to the finishing step.

In such a case, when the buffer 120 has a capacity equivalent to the size of data acquired per buffering trigger, with an abnormality detected in the inspection process, the data in the roughing step cannot be logged.

However, the PLC 100 according to the present embodiment allows data in the roughing step to be logged by setting a canceling condition for canceling the buffering upon completion of the grinding step and the buffering upon completion of the finishing step to control data stored in the buffer 120.

In the above case, a buffering condition under which no buffering trigger is generated in the grinding step and the finishing step may be set to achieve appropriate logging. However, in some cases, such a buffering condition is to be set based on expert know-how, and the setting may be difficult. In other cases, any buffering condition being set may avoid changing the condition. In these cases, with no abnormality found in the data in the roughing step, the grinding step and the finishing step may be logged for examination. To achieve this, the PLC 100 according to the present embodiment allows data output from the buffer 120 to be flexibly controlled by changing the canceling condition without changing the buffering condition.

When the buffer 120 is saturated with data stored in the buffer 120, until the canceling condition is satisfied or data is read out by the logger 145 from the buffer 120, the buffering device 144 maintains the data stored in the buffer 120 and discards new data to be stored when the buffering condition is satisfied further. The buffer 120 being saturated, or in other words, a free space for new buffering being insufficient, is equivalent to the sum of the size of new data to be stored and the size of buffer data included in the data stored in the buffer 120, and yet to be logged into the storage means 130 and yet to be read by the logger 145 exceeding the capacity of the buffer 120. When the canceling condition is satisfied, the buffering device 144 discards the buffer data. The buffering device 144 stores, into the buffer 120, data indicating the values collected when the buffering condition is satisfied after the canceling condition is satisfied.

When the canceling condition is satisfied, the buffering device 144 frees the entire area of the buffer 120 in which data is stored upon the buffering condition being satisfied immediately before the canceling condition is satisfied, and stores, into the freed area of the buffer 120, new data indicating the values collected upon the buffering condition being newly satisfied after the canceling condition is satisfied. The freed entire area of the buffer 120 corresponds to an example of a first area in which new data is stored by the buffering means.

Embodiment 2

Embodiment 2 is described focusing on the differences from Embodiment 1. Like reference signs denote the same or like components in Embodiment 1. The present embodiment differs from Embodiment 1 in that logged data indicates values collected during a specified period that starts before a start condition for starting buffering is satisfied and ends after an end condition for ending the buffering is satisfied.

Although the buffering condition in Embodiment 1 is a condition for starting buffering for a specified period having a predetermined length, change of the length of the specified period depending on the situation may be required. In such a case, an end condition for ending the buffering may be set. Additionally, although buffering in Embodiment 1 starts after satisfaction of the buffering condition, logging of a portion of the data before satisfaction of the buffering condition is required. Similarly, logging of a portion of the data after satisfaction of the end condition is required. Considering these requirements, logging of the data for a period that starts before satisfaction of the buffering start condition for starting buffering and ends after satisfaction of the buffering end condition for ending the buffering is described below.

Figure 15:
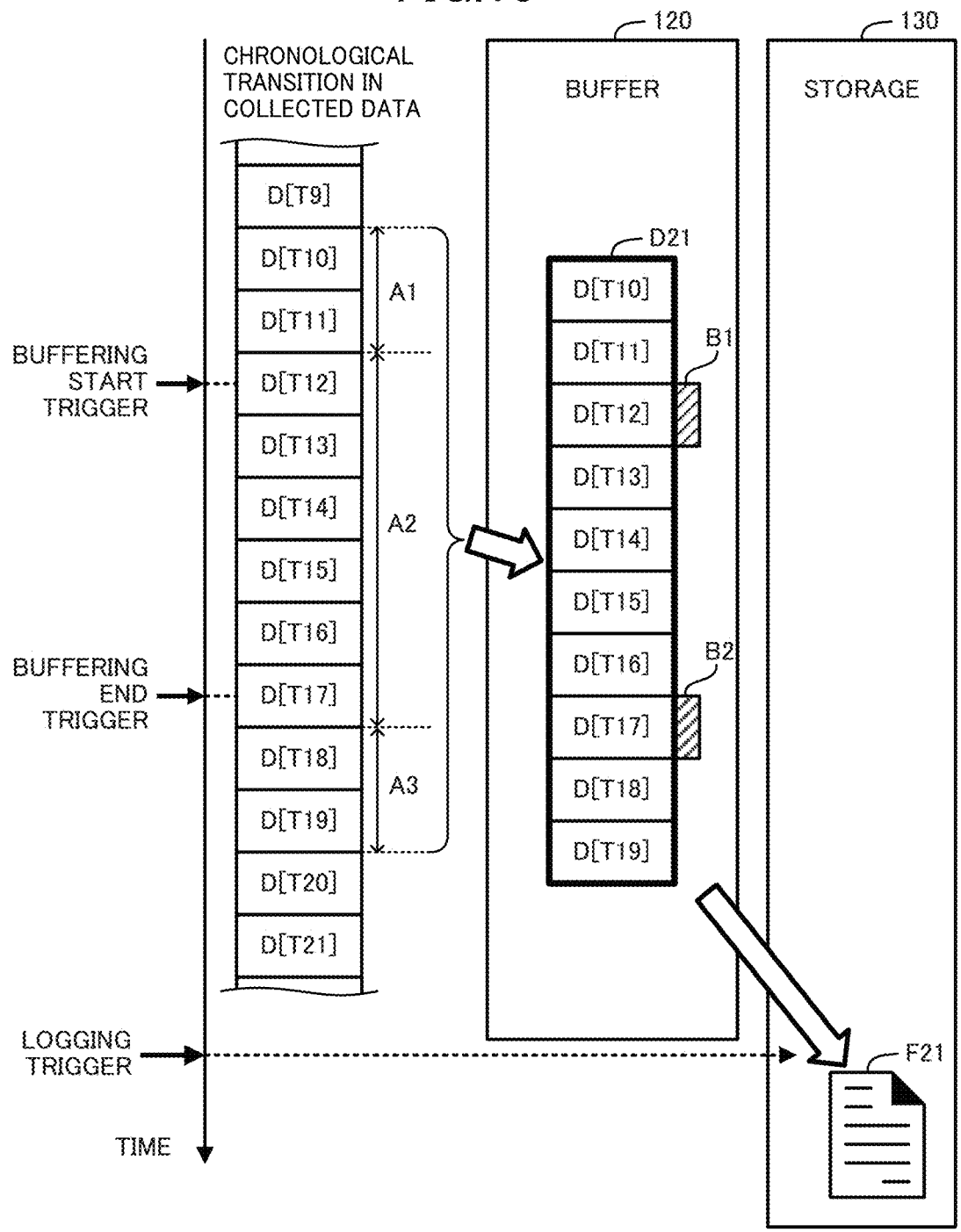
FIG. 15 is a diagram illustrating an overview of buffering and logging in Embodiment 2.

FIG. 15 illustrates an overview of buffering in the present embodiment. As illustrated in FIG. 15, data stored in the buffer 120 indicates values collected during a specified period including a first period A1 having a predetermined length until a buffering start trigger is generated, a second period A2 from the generation of the buffering start trigger to the generation of a buffering end trigger, and a third period A3 having a predetermined length from the generation of the buffering end trigger. The buffering start trigger corresponds to satisfaction of the buffering start condition and notification of the affirmative determination result from the trigger determiner 143 to the buffering device 144. The buffering end trigger corresponds to satisfaction of the buffering end condition and notification of the affirmative determination result from the trigger determiner 143 to the buffering device 144.

The buffering start condition and the buffering end condition may be determined to be satisfied or unsatisfied based on a device value 111 in the same manner as the buffering condition in Embodiment 1 or based on whether a trigger signal is received from an external device. The details of the buffering start condition and the buffering end condition are preset in the trigger determiner 143 by the setter 146. The buffering start condition and the buffering end condition are determined to be satisfied or unsatisfied by the trigger determiner 143.

To prepare for satisfaction of the buffering start condition, the buffering device 144 sequentially stores data indicating values collected by the collector 142 into the buffer 120 serving as a ring buffer. When the buffering start condition is satisfied, the buffering device 144 fixes, in the buffer 120, data indicating values acquired sequentially from values collected during a predetermined length of time before the buffering start condition is satisfied. In the example in FIG. 15, the buffering device 144 stores, into the buffer 120, data D[T10] and D[T11] collected during the first period A1 before the buffering start trigger is generated and prohibits the stored data from being overwritten and deleted.

The buffering device 144 then fixes, in the buffer 120, data indicating values collected during a period from when the buffering start condition is satisfied to when the buffering end condition is satisfied, and data indicating values collected sequentially during a period from when the buffering end condition is satisfied to a time point after a predetermined length of time. In the example in FIG. 15, the buffering device 144 stores, into the buffer 120, data D[T12], D[T13], D[T14], D[T15], D[T16], and D[T17] collected during the second period A2 from when the buffering start trigger is generated to when the buffering end trigger is generated and prohibits the stored data from being overwritten and deleted. The buffering device 144 further stores, into the buffer 120, data D[T18] and D[T19] collected during the third period A3 after the buffering end trigger is generated and prohibits the stored data from being overwritten and deleted. In this manner, the buffer 120 stores data D21 including the data D[T10] to D[T19] collected during the specified period including the first period A1, the second period A2, and the third period A3.

The length of each of the first period A1 and the third period A3 is input by the user and set in the buffering device 144 by the setter 146. The length of each of the first period A1 and the third period A3 is equivalent to, for example, 5 times or 50 times the scan time. Embodiment 1 corresponds to an example in which the buffering start condition is the same as the buffering end condition, with the length of the first period A1 set to zero and the length of the third period A3 specified by the user.

Independently of whether the buffering start condition and the buffering end condition are satisfied, the buffering device 144 stores data indicating collected values. Thus, the data fixed in the buffer 120 may be distinguished from the other data stored in the buffer 120. For example, information indicating that the buffering start condition and the buffering end condition are satisfied may be added. More specifically, in the example illustrated in FIG. 15, information B1 indicating the generation of the buffering start trigger is added to the data D[T12] in the buffer 120, and information B2 indicating the generation of the buffering end trigger is added to the data D[T17] in the buffer 120. However, a technique for distinguishing the data to be stored in the buffer 120 from the other data is not limited to the example illustrated in FIG. 15. In some examples, a 1-bit flag value may be added to each of the data D[T10] to the data D[T19]. In other examples, management information indicating data to be stored in the buffer 120 may be managed outside the buffer 120, and the management information may be referenced to determine the data to be stored in the buffer 120.

Figure 16:
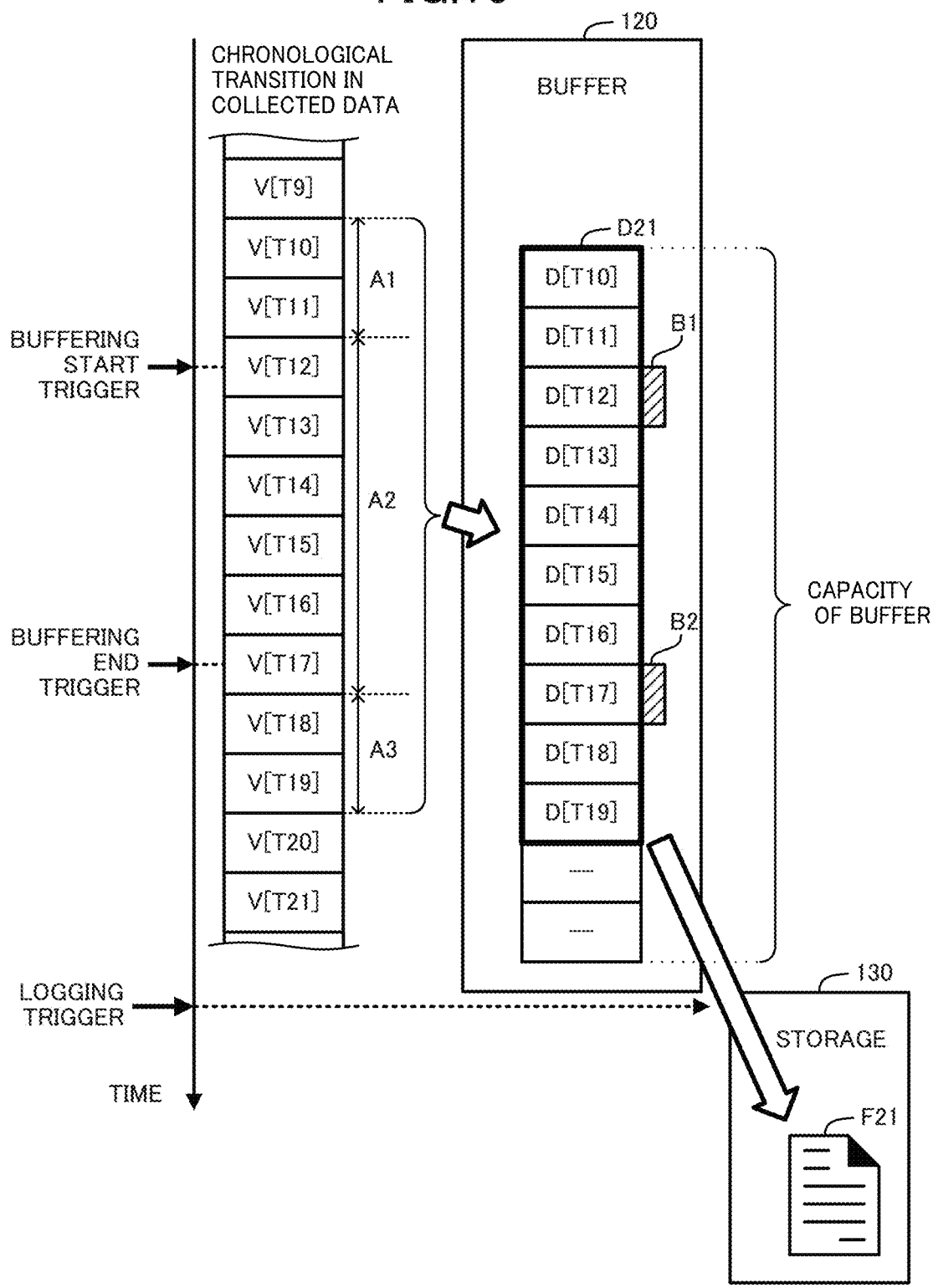
FIG. 16 is a diagram describing data indicating differences between values in a modification.

To prepare for the buffering end condition being unsatisfied after the buffering start condition is satisfied, and for a time length until the buffering end condition is satisfied being too long, the data storage capacity of the buffer 120 may be preset. The capacity of the buffer 120 may be set directly, or set indirectly by setting the upper limit of the length of the specified period for collecting values. When the size of data to be stored into the buffer 120 approaches the capacity of the buffer 120 as illustrated in FIG. 16 without the buffering end condition being satisfied, the buffering device 144 may store the largest possible size of data within the capacity into the buffer 120. When the buffer 120 is saturated without the buffering end condition being satisfied, the buffering is stopped at the time of the saturation or the buffering is continued by deleting and overwriting the oldest data. More specifically, the buffering device 144 stores, of the data collected during the first period A1, the second period A2, and the third period A3, data of a size smaller than or equal to the upper limit into the buffer 120. In this case, the setter 146 corresponds to an example of second receiving means for receiving a setting for the upper limit of the size of data stored into the buffer 120 per satisfaction of the buffering condition.

The buffer 120 may have a large capacity when the size of data stored in the buffer 120 varies depending on the generation timing of the buffering end trigger. Additionally, data stored into the buffer 120 may be compressed. For example, the buffering device 144 may store, into the buffer 120, data indicating the difference between two values collected by the collector 142. More specifically, as illustrated in FIG. 16, data D21 that may be buffered includes data D[T10] indicating a value V[T10] collected at time T10, data D[11] indicating the difference calculated by subtracting the value V[T10] collected at time T10 from a value V[T11] collected at time T11, and data D[T(N)] indicating the difference calculated by subtracting a value V[T(N-1)] collected at time T(N-1) from a value V[T(N)] collected at time T(N), where N is an integer from 12 to 19.

Figure 17:
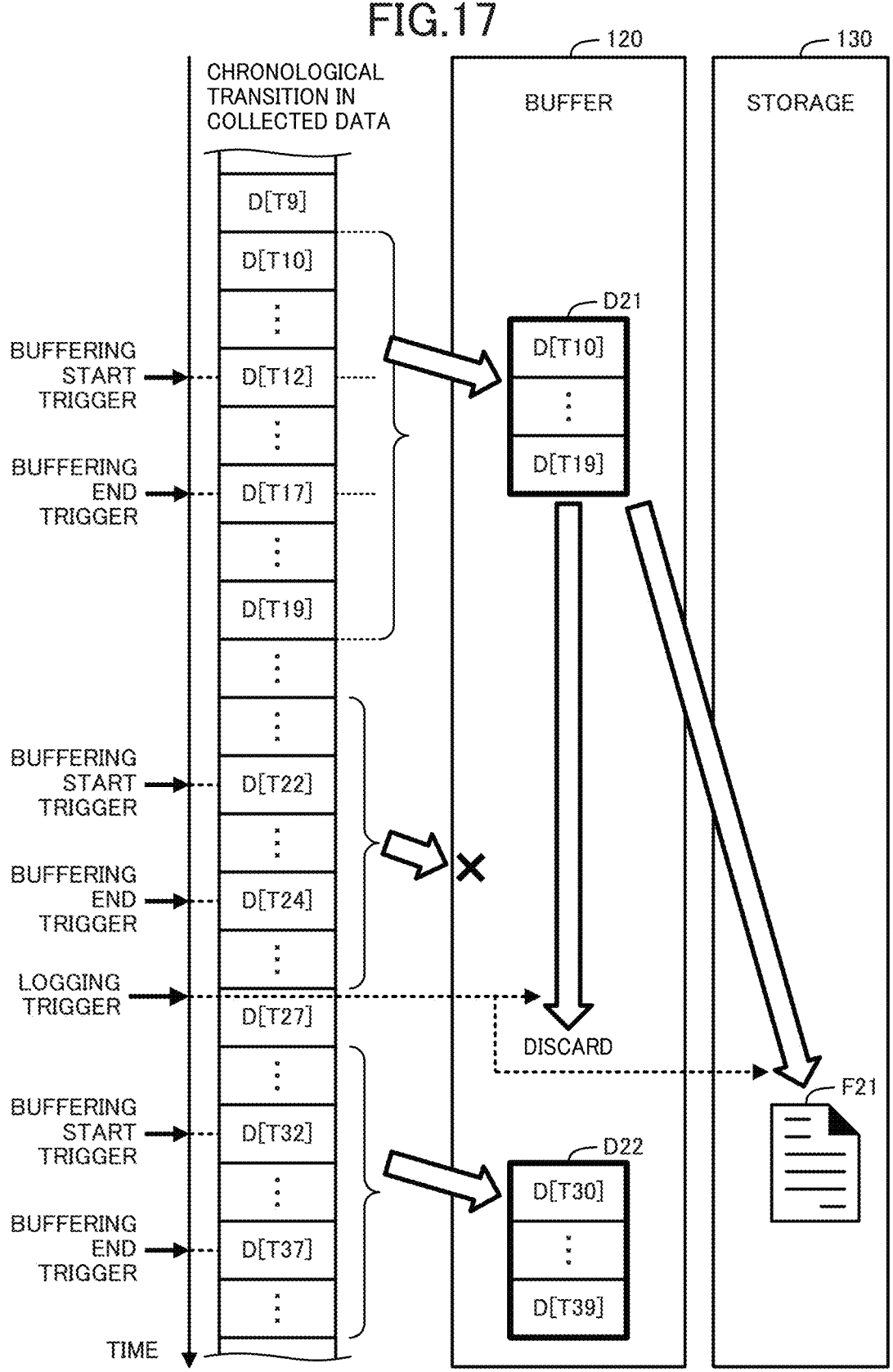
FIG. 17 is a diagram describing storage of data in a buffer in Embodiment 2.
Figure 18:
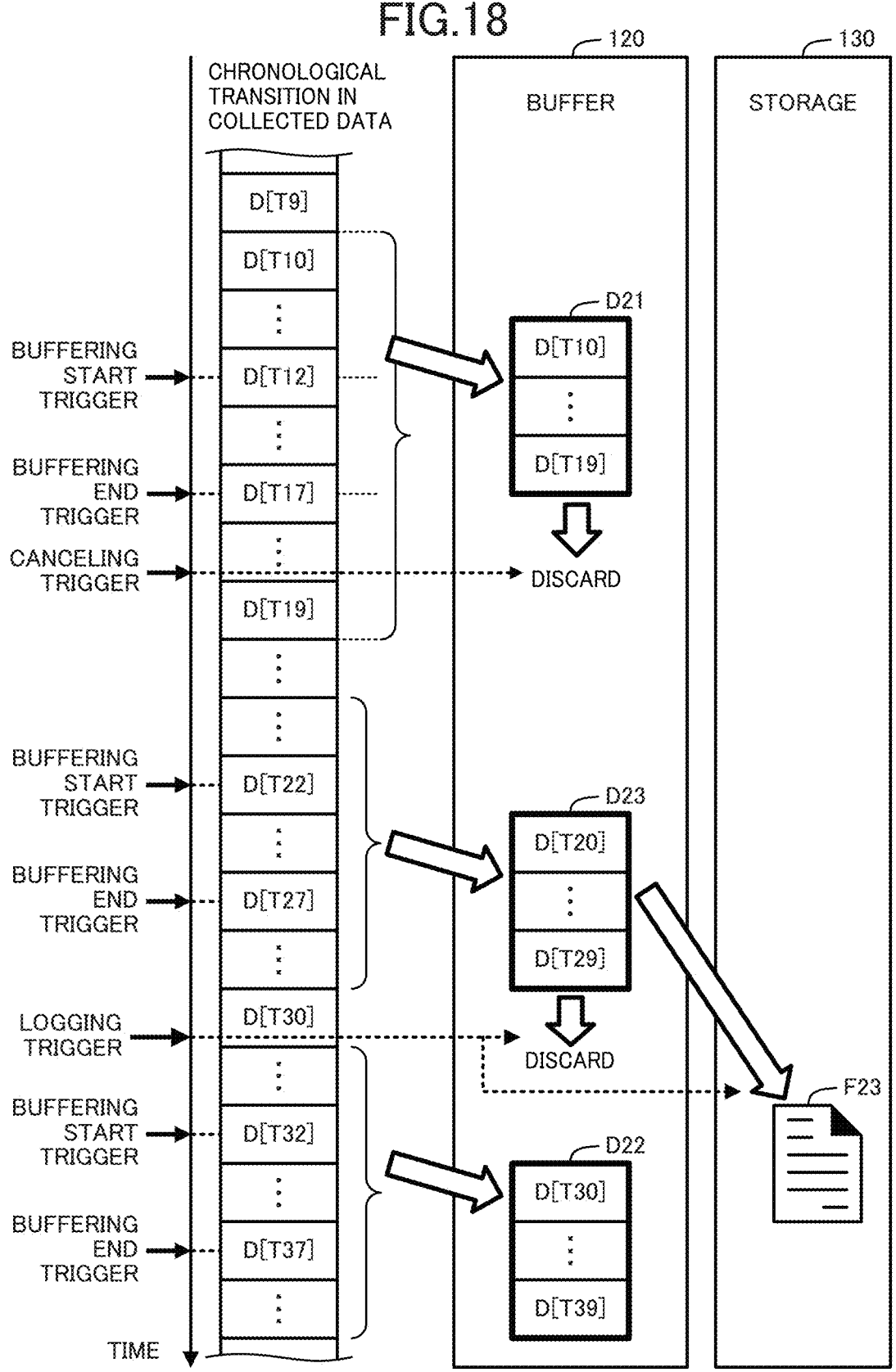
FIG. 18 is a diagram describing a canceling trigger in Embodiment 2.

As illustrated in FIG. 17, when a set of a buffering start trigger and a buffering end trigger is generated twice without a logging trigger or a canceling trigger being generated, the data corresponding to the second set is discarded instead of being stored into the buffer 120. As illustrated in FIG. 18, when a canceling trigger is generated, the data stored in the buffer 120 is discarded in response to the canceling trigger, and data D23 including data D[T20] to D[T29] is stored into the buffer 120 in response to the second buffering start trigger and buffering end trigger.

Data to be stored in the buffer 120 is read by the logger 145 when a logging trigger is generated and the data is stored into the storage 130. In the example in FIG. 17, data D21 is logged as a file F21. In the example in FIG. 18, the data D23 is logged as a file F23. When a logging trigger is generated, the buffer 120 is freed to allow storage of new data. In the examples in FIGS. 17 and 18, after a logging trigger is generated, data D22 including data D[T30] to D[T39] is buffered in response to the third buffering start trigger and buffering end trigger.

Figure 19:
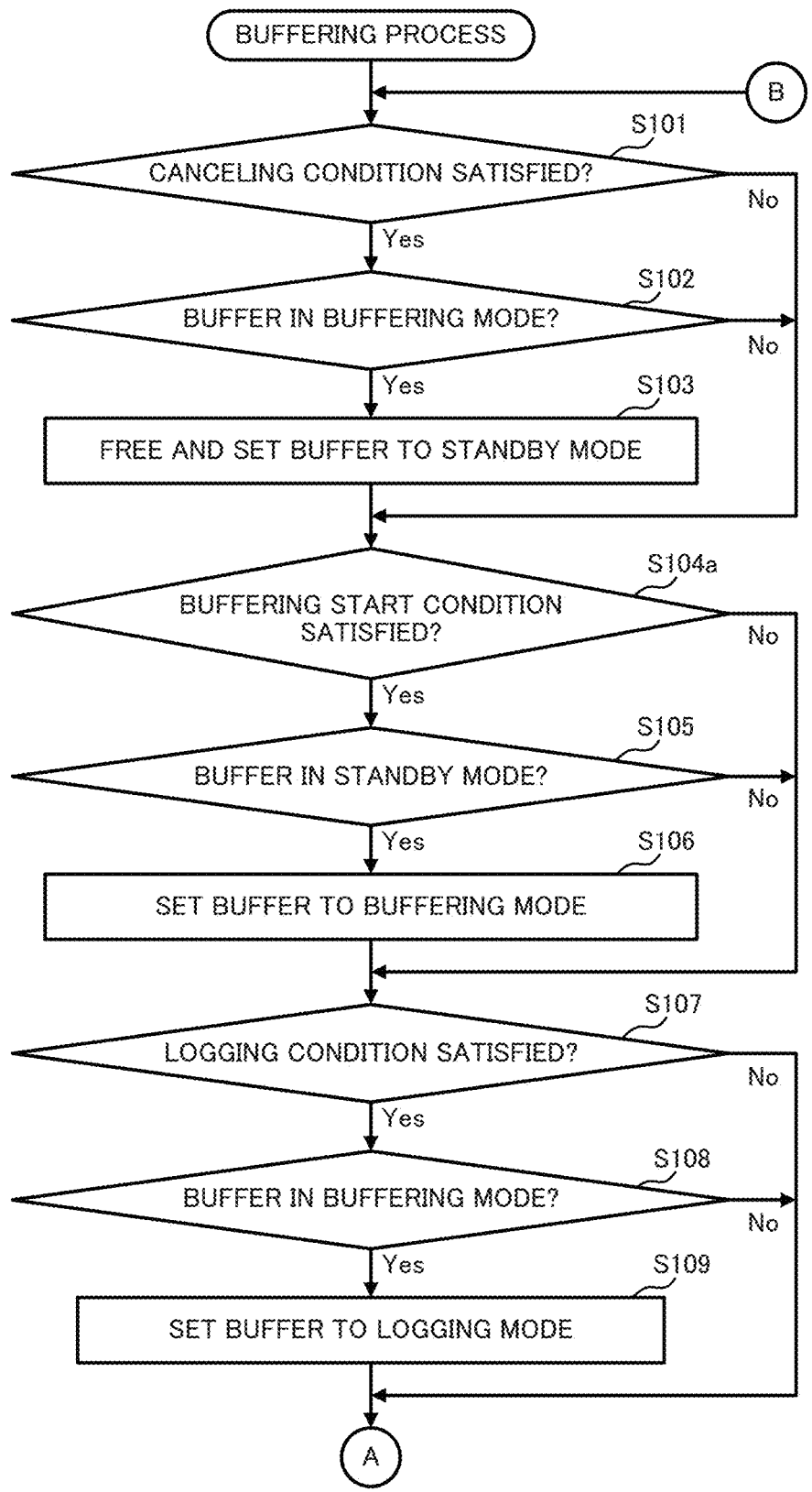
FIG. 19 is a first flowchart illustrating a buffering process in Embodiment 2.

The buffering process in the present embodiment is described with reference to FIG. 19. As illustrated in FIG. 19, in the buffering process, steps S101 to S103 are performed in the same manner as in Embodiment 1.

When the determination result in step S101 is negative (No in step S101), the determination result in step S102 is negative (No in step S102), or step S103 is complete, the trigger determiner 143 determines whether the buffering start condition is satisfied (step S104a). When the buffering start condition is determined to be satisfied (Yes in step S104a), the processing advances to step S105. When the buffering start condition is determined to be unsatisfied (No in step S104a), the processing advances to step S107.

Figure 20:
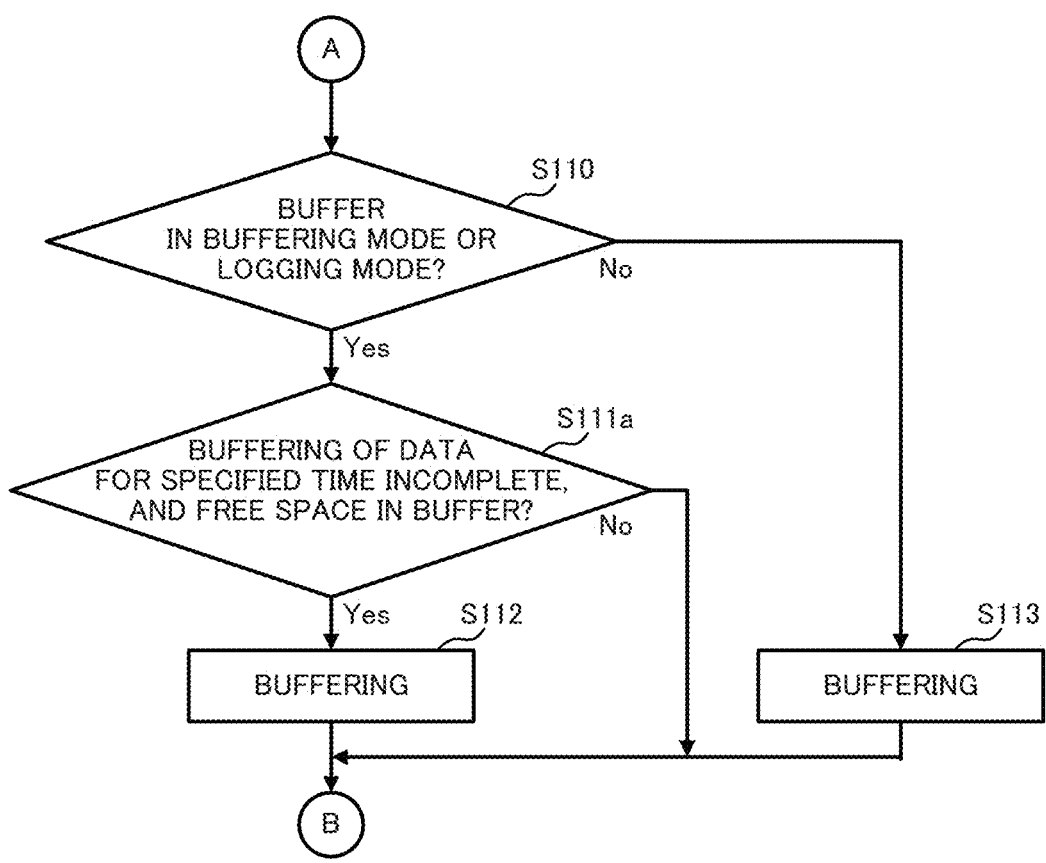
FIG. 20 is a second flowchart illustrating the buffering process in Embodiment 2.

Steps S105 to S109 are performed in the same manner as in Embodiment 1, and also step S110 is performed in the same manner as in Embodiment 1, as illustrated in FIG. 20.

When the determination result in step S110 is affirmative (Yes in step S110), the buffering device 144 determines whether buffering of data for a specified time is incomplete and the buffer 120 has a free space (step S111a). The buffering of data for a specified time corresponds to buffering of data collected during a period from when the buffering end condition is satisfied to a time after a predetermined length of time.

When the determination result in step S111a is affirmative (Yes in step S111a), the buffering device 144 buffers data (step S112). The processing then advances to step S101 in FIG. 19. In contrast, when the determination result in step S111a is negative (No in step S111a), the buffering device 144 advances the processing to step S101 without buffering data.

When the determination result in step S110 is negative (No in step S110), the buffering device 144 buffers data (step S113). More specifically, the buffering device 144 stores data indicating the values collected by the collector 142 into the buffer 120. The buffering in step S113 corresponds to the buffering to prepare for satisfaction of the buffering start condition. The processing then advances to step S101.

As described above, the buffering start condition and the buffering end condition are set, and data collected before the buffering start condition is satisfied and data collected after the buffering end condition is satisfied are to be logged. This technique also produces the same advantageous effects as in Embodiment 1.

Figure 21:
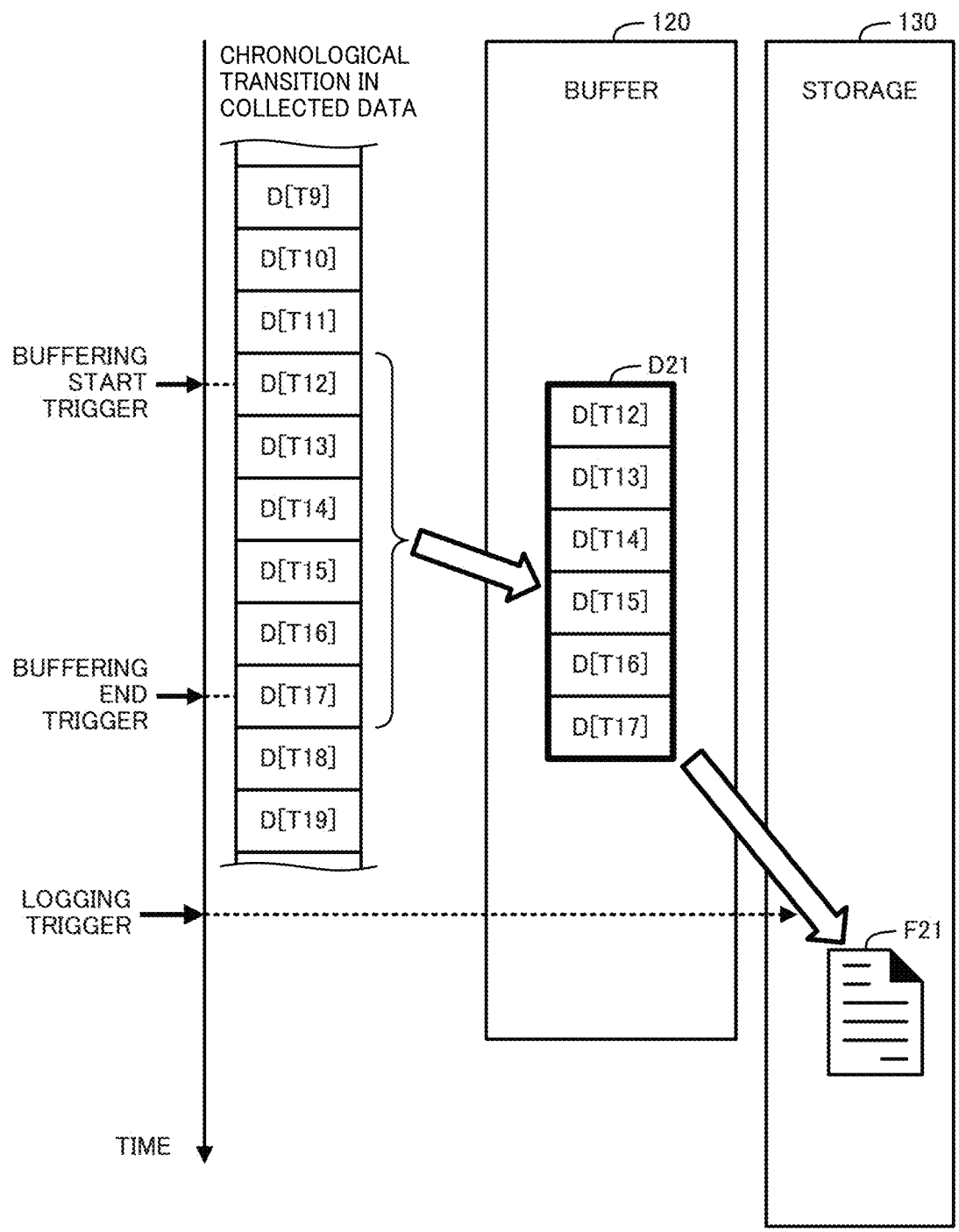
FIG. 21 is a first diagram describing buffering in a modification.

As illustrated in FIG. 21, the buffering device 144 may buffer data indicating the values collected during the period from when a buffering start trigger is generated to when a buffering end trigger is generated. The example in FIG. 21 corresponds to when the lengths of the first period A1 and the third period A3 in Embodiment 2 are set to zero. In this case, the buffering device 144 may start buffering when a buffering start trigger is generated, and may not buffer data before the buffering start trigger is generated.

Figure 22:
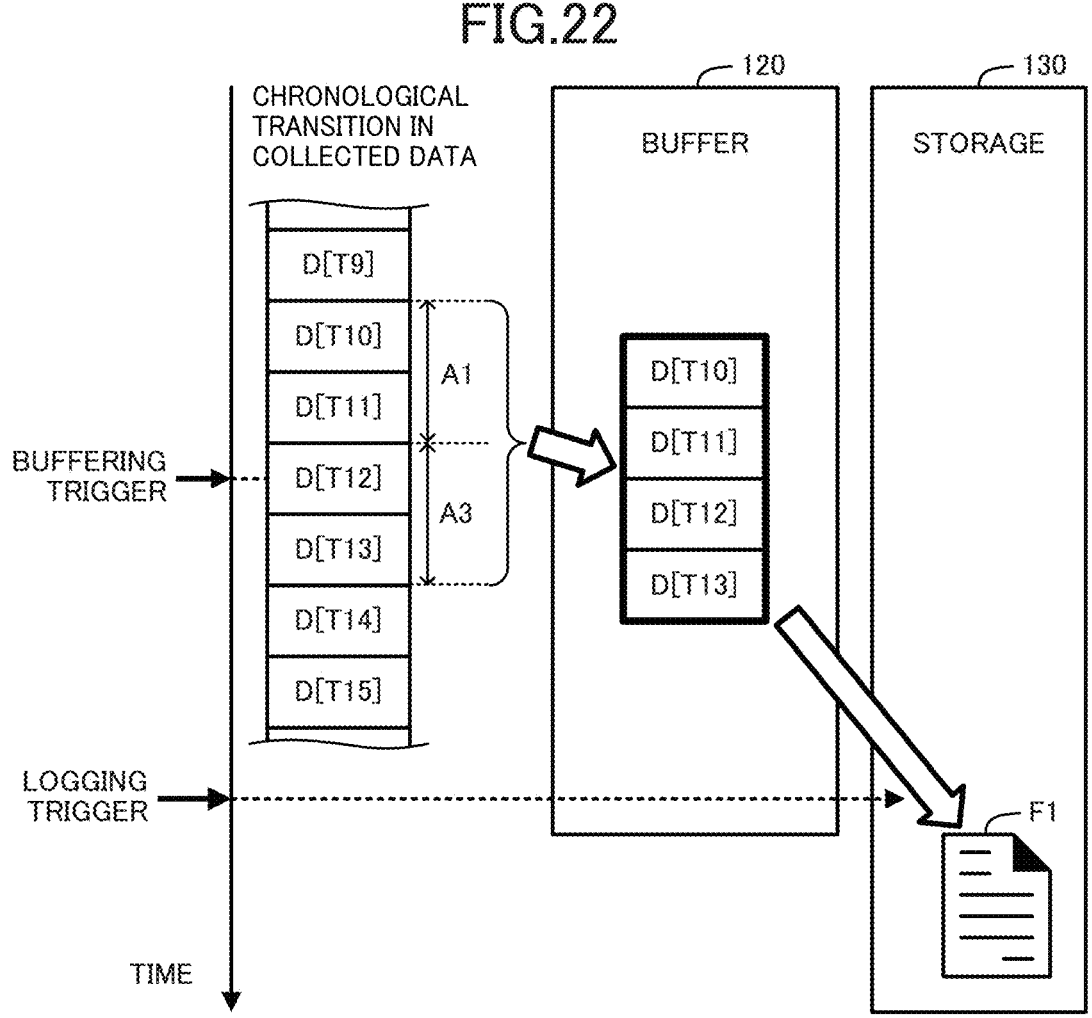
FIG. 22 is a second diagram describing buffering in a modification.

As illustrated in FIG. 22, the buffering device 144 may buffer data indicating the values collected during a specified period including the first period A1 before a buffering trigger is generated and the third period A3 after the buffering trigger is generated. The example in FIG. 22 corresponds to when the buffering start condition in Embodiment 2 is the same as the buffering end condition. In this case, the buffering device 144 is to buffer data also before the buffering trigger is generated to prepare for the buffering trigger being generated.

Embodiment 3

Embodiment 3 is described focusing on the differences from Embodiment 1. Like reference signs denote the same or like components in Embodiment 1. The present embodiment differs from Embodiment 1 in that each time the buffering condition is satisfied, the corresponding data is stored into the buffer 120.

Figure 23:
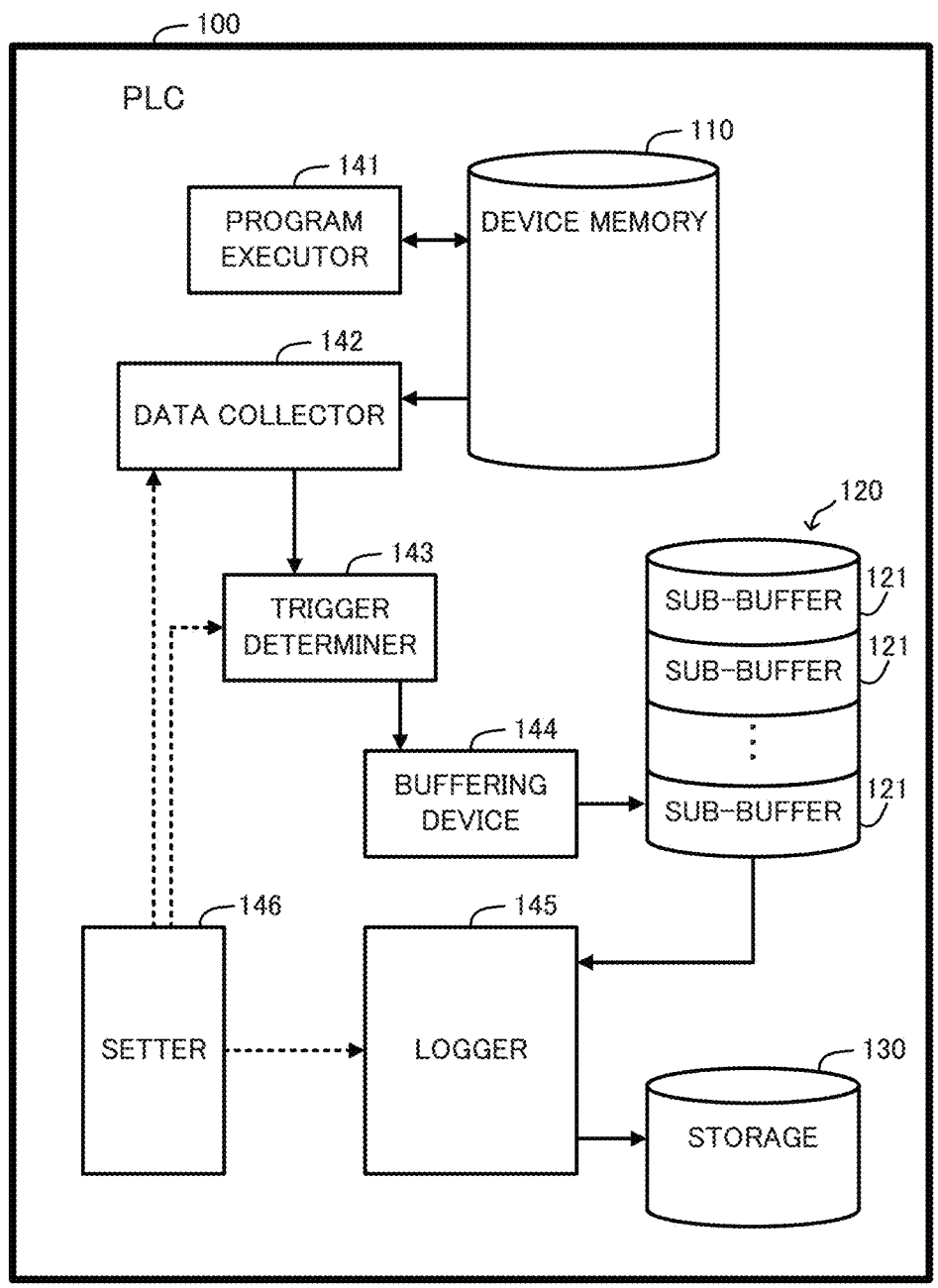
FIG. 23 is a functional block diagram of a PLC in Embodiment 3.

As illustrated in FIG. 23, the buffer 120 includes multiple sub-buffers 121. Each sub-buffer 121 stores data per satisfaction of the buffering condition. More specifically, the capacity of each sub-buffer 121 is larger than the size of data being buffering target when the buffering condition is satisfied once and smaller than the size of data being the buffering target when the buffering condition is satisfied twice.

Figure 24:
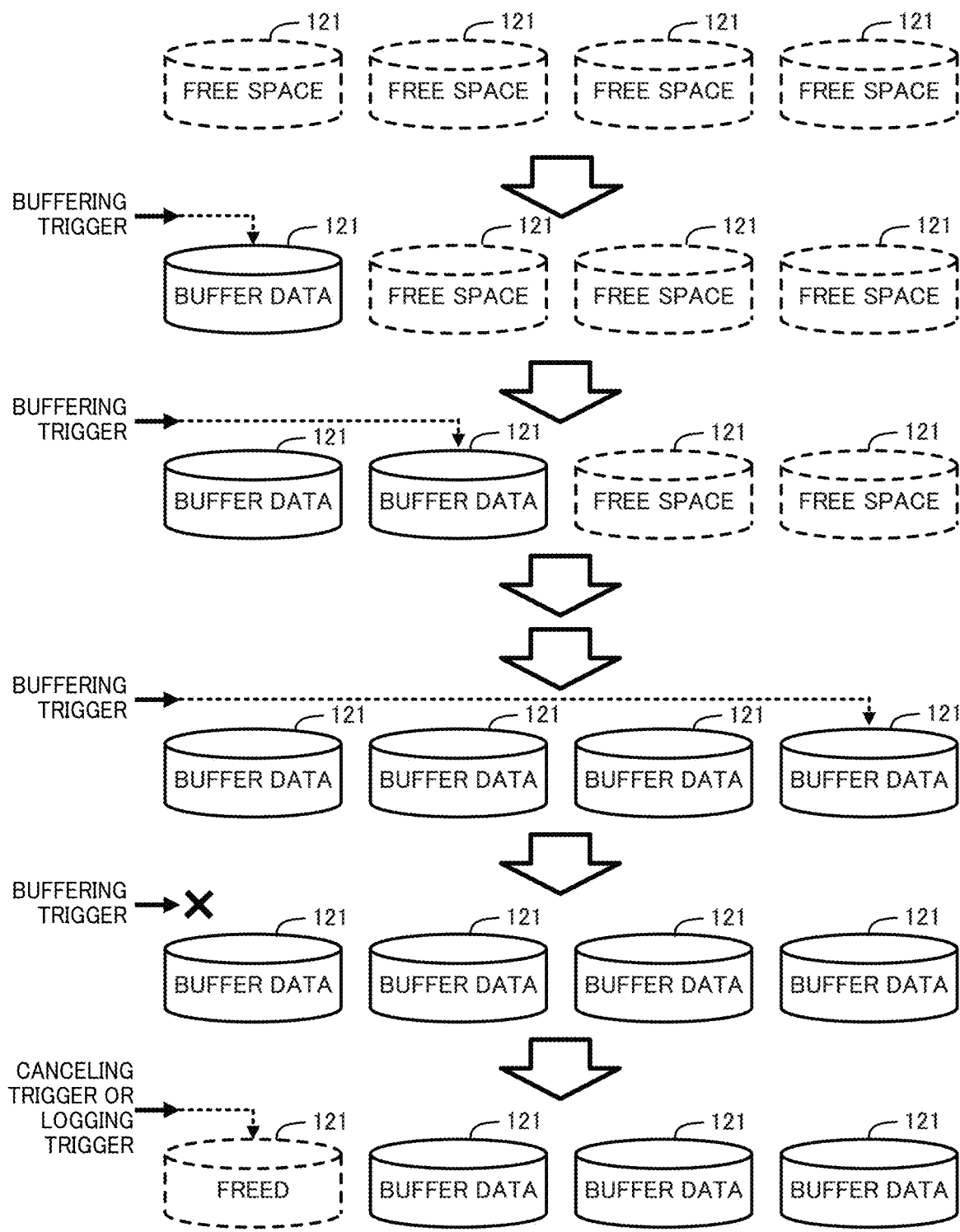
FIG. 24 is a diagram describing sub-buffer switching in Embodiment 3.

FIG. 24 illustrates an overview of buffering to the sub-buffers 121. As illustrated in FIG. 24, in the initial state, all the sub-buffers 121 are free spaces. Each time a buffering trigger is generated, the sub-buffer 121 for storage of data is switched, and the buffering device 144 stores the buffer data corresponding to the buffering trigger. The buffer data is then stored in the sub-buffers 121.

When another buffering trigger is generated after buffer data is stored into all the sub-buffers 121, the saturated buffer 120 has no free space. The data corresponding to the buffering trigger is discarded instead of being stored into the buffer 120. When a canceling trigger or a logging trigger is generated, the data stored in any sub-buffer 121 is discarded to free the sub-buffer 121, allowing storage of new data.

The sub-buffer 121 to be freed upon a canceling trigger being generated is determined in a predetermined manner. For example, the sub-buffer 121 to be freed may be determined in cycles in which one sub-buffer 121 is selected from the multiple sub-buffers in a predetermined order. The sub-buffer 121 storing the oldest data may be freed. In some examples, a canceling trigger is associated with each sub-buffer 121. One sub-buffer 121 may be freed when the canceling trigger corresponding to the one sub-buffer 121 is generated.

The sub-buffer 121 to be freed when a logging trigger is generated and data is read out may also be determined in a predetermined manner. When a logging trigger is generated, the sub-buffer 121 to be freed may be specified based on a user input. For example, the number of buffering triggers or the number of buffering start and buffering end trigger sets may be specified to free the sub-buffer 121 in which data is stored in response to the triggers generated before the specified number. An identifier for a sub-buffer 121 may be directly specified. In some examples, when at least one of a buffering trigger, a buffering start trigger, or a buffering end trigger is generated, a trigger identification (ID) for identifying the trigger may be generated, and the trigger ID may be used to specify the sub-buffer 121.

As described above, the buffer 120 has a capacity for storing data corresponding to multiple buffering triggers. When the canceling condition is satisfied, the buffering device 144 switches the sub-buffer for storage of data, discards the data stored in the newly selected sub-buffer, and stores, into the sub-buffer, data indicating the values collected when the buffering condition is satisfied after the canceling condition is satisfied. The technique in Embodiment 2 also produces the same advantageous effects as in Embodiment 1.

Although the buffer 120 including the divided sub-buffers 121 is described, the buffer 120 is not limited to this example. The buffer 120 may have a capacity larger than in Embodiment 1, and data may be buffered and logged in substantially the same manner as in the present embodiment. In this example, when the buffer 120 is saturated, the buffer data in the buffer 120 is maintained. When the canceling condition is satisfied, the buffering device 144 stores new data into the area in the buffer 120 freed under the canceling condition. The area corresponds to an example of a second area predetermined in the buffer 120.

The present embodiment may be modified in the same manner as Embodiment 1 is modified into Embodiment 2 as described above. More specifically, in place of the buffering trigger, the sub-buffers 121 may store the data collected during a specified period that starts before a buffering start trigger is generated and ends after a buffering end trigger is generated. When the buffering start trigger and the buffering end trigger are used, the capacity of each sub-buffer 121 may be preset. In some examples, the buffer 120 having a certain capacity may be divided into the sub-buffers 121, and the capacity of each sub-buffer 121 may be set by specifying the number of sub-buffers 121 in the buffer 120.

Embodiment 4

Embodiment 4 is described focusing on the differences from Embodiment 3. Like reference signs denote the same or like components in Embodiment 3. The present embodiment differs from Embodiment 3 in that the canceling trigger is replaced with a switch trigger for switching sub-buffers 121.

The switch trigger corresponds to satisfaction of a preset switching condition and notification of the affirmative determination result from the trigger determiner 143 to the buffering device 144. The details of the switching condition are input by the user and set in the trigger determiner 143 by the setter 146.

Figure 25:
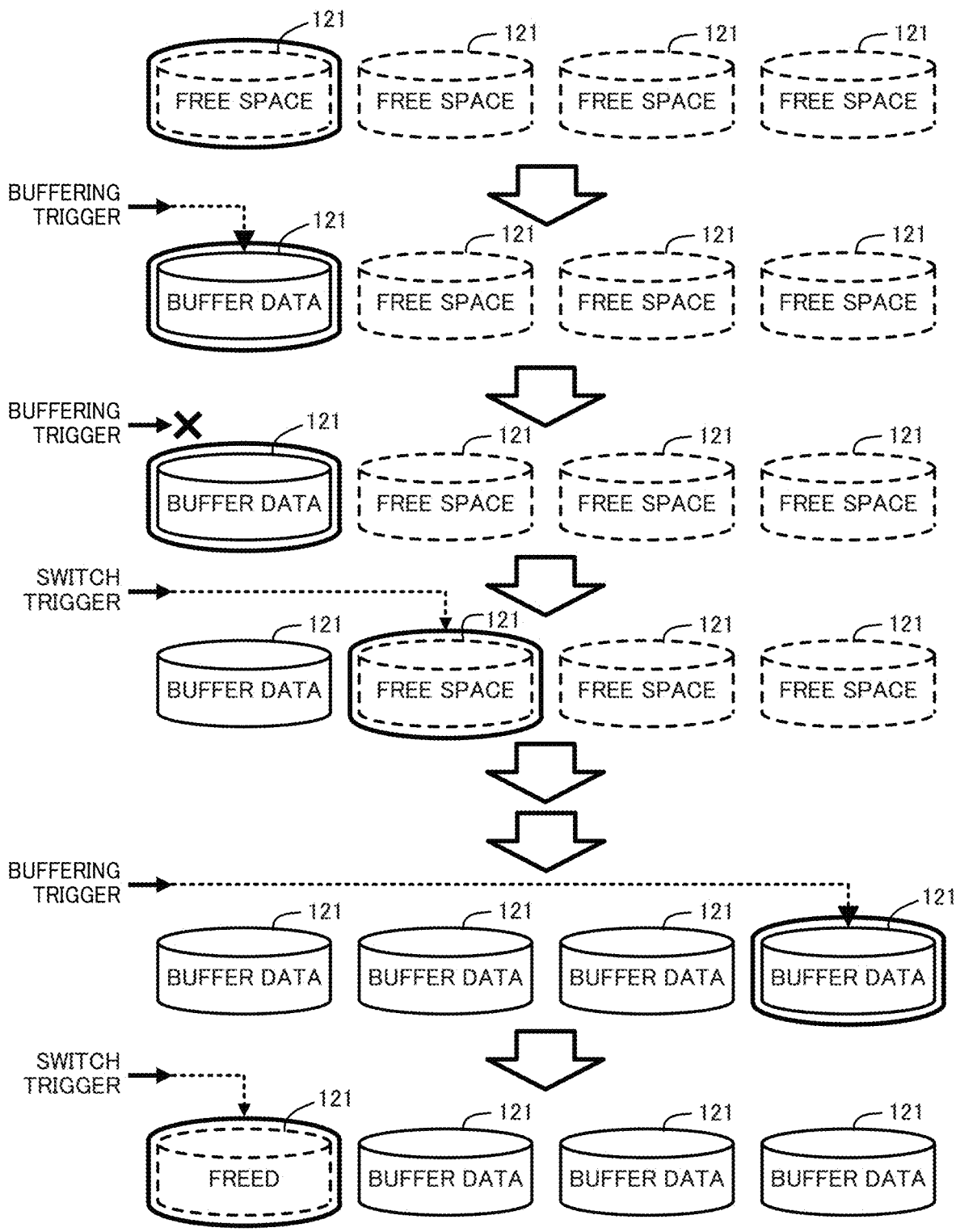
FIG. 25 is a diagram describing sub-buffer switching in Embodiment 4.

FIG. 25 illustrates switching between the sub-buffers 121 in response to the switch trigger. In FIG. 25, the sub-buffer 121 currently selected among the multiple sub-buffers 121 is surrounded by a bold line for emphasis. In the initial state, all the sub-buffers 121 correspond to free spaces, and any one of the sub-buffers 121 is selected.

When a buffering trigger is generated, data is stored into the currently selected sub-buffer 121. Although a buffering trigger is generated again without a switch trigger or a logging trigger being generated, the currently selected sub-buffer 121 is saturated. Thus, the buffering trigger is ignored, and no data is buffered.

When a switch trigger is generated, the sub-buffer 121 corresponding to the next free space is selected. When the sub-buffers 121 are switched sequentially, and data is stored in all the sub-buffers 121, the buffer 120 is saturated. With the buffer 120 saturated, another buffering trigger being generated is ignored, and no data is buffered in the same manner as in Embodiment 3.

When a switch trigger is generated to switch the sub-buffer 121, the data stored in the newly selected sub-buffer 121 is discarded to free the sub-buffer 121, allowing storage of new data.

The order in which the sub-buffers 121 are switched in response to switch triggers may be determined in the same manner as the determination of the sub-buffer 121 to be freed when a canceling trigger is generated in Embodiment 3, or may be specified based on a user input in the same manner as when a logging trigger is generated in Embodiment 3.

As described above, data to be stored into the buffer 120 and data to be discarded are controlled depending on whether a switch trigger is generated. The technique using the switch trigger also produces the same advantageous effects as in Embodiment 3.

Embodiment 5

Embodiment 5 is described focusing on the differences from Embodiment 2. Like reference signs denote the same or like components in Embodiment 2. The present embodiment differs from Embodiment 2 in that multiple buffering conditions having different priorities indicating priorities of buffering are determined to be satisfied or unsatisfied.

Figure 26:
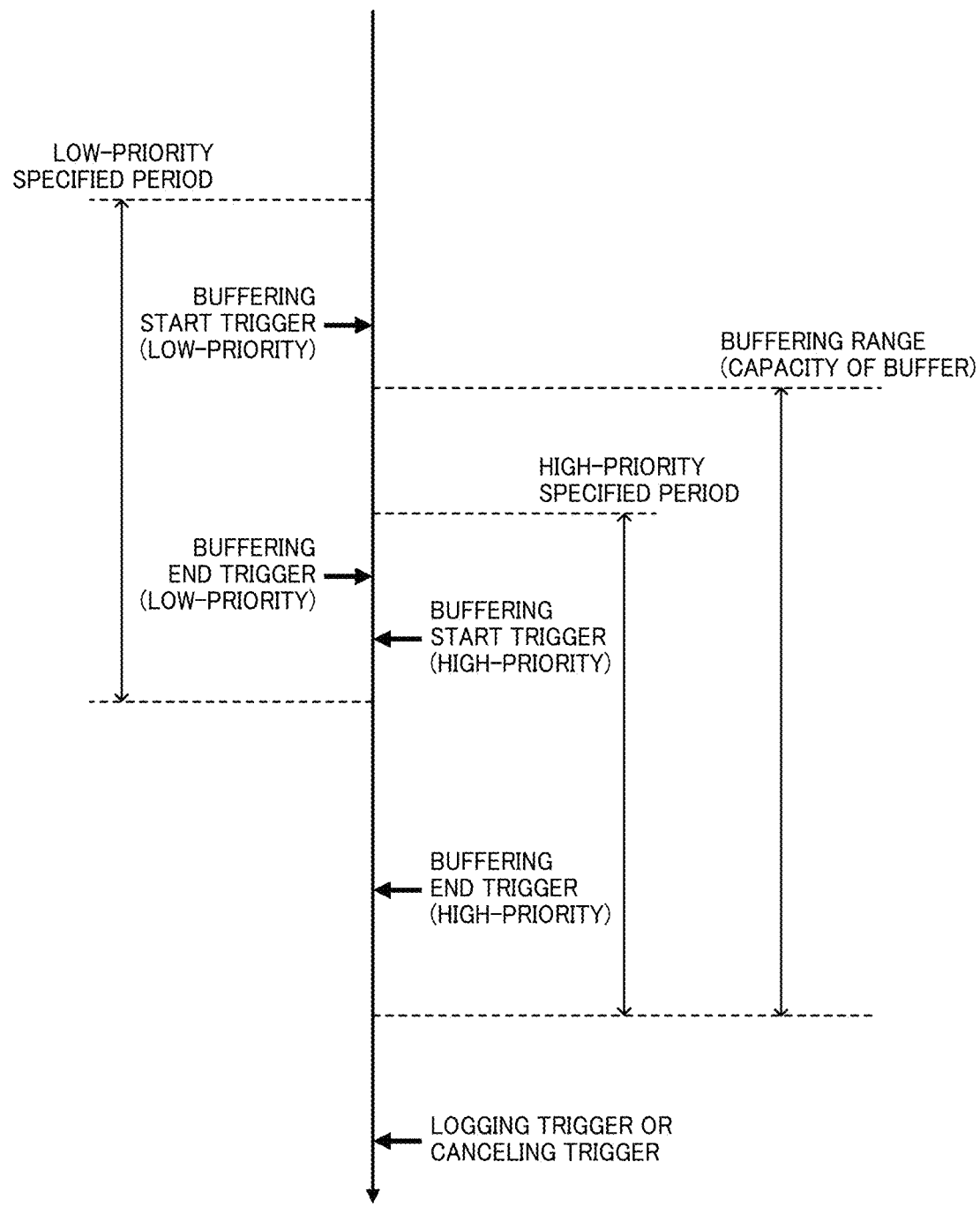
FIG. 26 is a first diagram describing buffering in Embodiment 5.

When multiple buffering start conditions having different priorities are satisfied within a short time, and the data sets to be stored under the conditions overlap with each other, the buffering device 144 in the present embodiment stores, into the buffer 120, the data to be stored when the highest-priority buffering start condition is satisfied in priority to the data to be stored when the other low-priority buffering conditions are satisfied. For example, as illustrated in FIG. 26, when a high-priority buffering start trigger is generated to follow a low-priority buffering end trigger, data indicating the values collected during the specified period corresponding to the high-priority trigger is buffered. As illustrated in FIG. 26, the buffering device 144 may buffer the data for the high-priority specified period as well as a part of the data for the low-priority specified period within the capacity of the buffer. The part of the data corresponding to the low-priority trigger is thus logged and may be used for subsequent examination.

Figure 27:
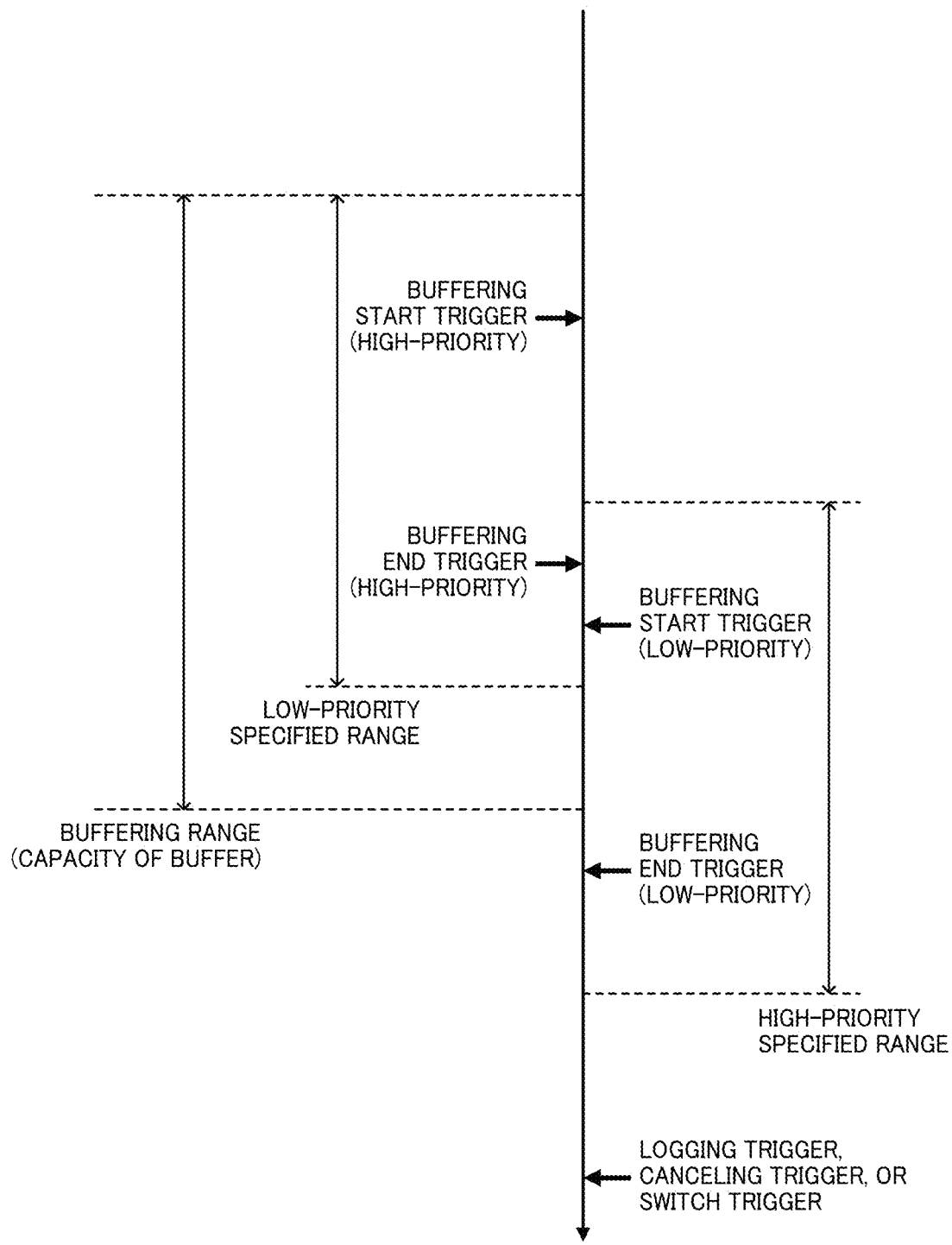
FIG. 27 is a second diagram describing buffering in Embodiment 5.

As illustrated in FIG. 27, when a low-priority buffering start trigger is generated to follow a high-priority buffering end trigger, the buffering device 144 may buffer the data for the high-priority specified period as well as a part of the data for the low-priority specified period within the capacity of the buffer.

Additionally, data sets to be stored may overlap with each other when multiple buffering start conditions having equal priorities are satisfied. In this case, the user may predetermine whether the earlier data or the later data is to be buffered. More specifically, the user may predetermine whether the buffering start condition satisfied earlier corresponds to the high-priority condition illustrated in FIG. 27 or the buffering start condition satisfied later corresponds to the high-priority condition illustrated in FIG. 26. When the user determines whether the earlier data or the later data is prioritized, the setting input by the user is received by the setter 146 and provided to the trigger determiner 143. In this case, the setter 146 corresponds to an example of first receiving means for receiving a setting for assigning a priority to storage of data for the earlier buffering condition to be satisfied or assigning a priority to storage of data for the later buffering condition to be satisfied. The buffering device 144 then stores data into the buffer 120 based on the setting received by the setter 146.

In the example described above, the buffering start conditions having different priorities are preset. However, the trigger determiner 143 may determine priorities when determining identical buffering start conditions, and assign the priorities to the buffering start triggers.

Although one or more embodiments of the present disclosure have been described above, the present disclosure is not limited to the above embodiments.

More specifically, the above embodiments may be combined as appropriate. For example, data corresponding to a high-priority trigger as used in Embodiment 5 may be buffered with a priority into the sub-buffers 121 in Embodiment 3 or 4. Embodiments 3 and 4 may be combined to use both the canceling trigger and the switch trigger.

In the example described above, the history of the value stored in one address in the device memory 110 is stored. However, the PLC 100 may store the histories of values stored in multiple addresses.

In the non-limiting example described above, the timing of the acquisition of a value by the collector 142 matches the timing of the determination performed by the trigger determiner 143 as to whether a condition is satisfied. However, the trigger determiner 143 may determine whether a condition is satisfied for a value collected a certain time earlier, or temporarily reserve the determination result and use the result of the determination as to whether a condition is satisfied for a value collected a certain time later. The buffering device 144 is to store data collected at the timing corresponding to satisfaction of the buffering start condition.

In the non-limiting example described above, the buffering device 144 stores data indicating sequentially collected values into the buffer 120. However, for example, when an instantaneous value is more relevant in subsequent examination than transition of values during a short time, data indicating one value collected at the timing corresponding to satisfaction of a condition may be buffered and logged to save the capacity of the buffer 120.

The functions of the PLC 100 can be implemented by a dedicated hardware device or by a common computer system.

For example, the program P1 may be stored in a non-transitory computer-readable recording medium, such as a flexible disc, a compact disc read-only memory (CD-ROM), a digital versatile disc (DVD), or a magneto-optical (MO) disk, for distribution. The program P1 can be installed in a computer to provide a device that performs the above processing.

The program P1 may be stored in a disk device included in a server on a communication network, such as the Internet, and may be, for example, superimposed on a carrier wave to be downloaded to a computer.

The processing described above may also be performed by the program P1 activated and executed while being transferred through a communication network, such as the Internet.

The processing described above may also be performed by entirely or partially executing the program P1 on a server while a computer is transmitting and receiving information about the processing through a communication network.

In the system with the above functions implementable partially by the operating system (OS) or through cooperation between the OS and applications, portions executable by applications other than the OS may be stored in a non-transitory recording medium that may be distributed or may be downloaded to the computer.

Means for implementing the functions of the PLC 100 is not limited to software. The functions may be partially or entirely implemented by dedicated hardware including circuits.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The technique according to one or more embodiments of the present disclosure is suitable for logging of data used for control performed by a PLC.

REFERENCE SIGNS LIST

1000 PLC system
100 PLC
101 Processor
102 Main storage
103 Auxiliary storage
104 Input device
105 Output device
106 Communicator
107 Internal bus
110 Device memory
111 Device value
120 Buffer
121 Sub-buffer
130 Storage
141 Program executor
142 Collector
143 Trigger determiner
144 Buffering device
145 Logger
146 Setter
200 Mechanical device
300 Display data generation device
301 Display device
A1 First period
A2 Second period
A3 Third period
B1, B2 Information
D1 to D3, D21 to D23 Data
F1, F3, F21, F23 File
P1 Program
P2 Control program

The invention claimed is:

1. A programmable controller for controlling a device, the programmable controller comprising:
processing circuitry to
repeatedly collect, from a memory, a value varying depending on control of the device,
set parameters,
store, into a buffer, a set of data indicating the value collected at a timing corresponding to satisfaction of a buffering condition set as a parameter included in the parameters,
read the set of data from the buffer upon a logging condition being satisfied and store the set of data into a storage as a set of log data, the logging condition being set as a parameter included in the parameters, and
discard the set of data stored in the buffer upon another condition being satisfied, the other condition being different from the buffering condition and the logging condition and being set as a parameter included in the parameters.

2. The programmable controller according to claim 1, wherein
when a sum of a size of a piece of buffer data included in the set of data stored in the buffer and yet to be read and a size of a set of new data to be stored into the buffer upon the buffering condition being satisfied exceeds a capacity of the buffer, the processing circuitry discards the set of new data to be stored and causes the buffer to maintain storage of the piece of buffer data until the other condition is satisfied, and
upon the other condition being satisfied, the processing circuitry discards the piece of buffer data and stores, into the buffer, a set of data indicating a value collected at a timing corresponding to satisfaction of the buffering condition after the other condition is satisfied.

3. The programmable controller according to claim 1, wherein
upon the other condition being satisfied, the processing circuitry stores, into a first area in the buffer, a set of data indicating a value collected at a timing corresponding to satisfaction of the buffering condition after the other condition is satisfied, the first area being an area in which the set of data is stored upon the buffering condition being satisfied immediately before satisfaction of the other condition.

4. The programmable controller according to claim 1, wherein
upon the other condition being satisfied, the processing circuitry stores, into a second area predetermined in the buffer, a set of data indicating a value collected at a timing corresponding to satisfaction of the buffering condition after the other condition is satisfied.

5. The programmable controller according to claim 1, wherein
the buffer includes a plurality of sub-buffers each to store a set of data per satisfaction of the buffering condition, and
upon the other condition being satisfied, the processing circuitry switches a sub-buffer, of the plurality of sub-buffers, for storage of a set of data, discards a set of data stored in a newly selected sub-buffer, and stores, into the newly selected sub-buffer, a set of data indicating a value collected at a timing corresponding to satisfaction of the buffering condition after the other condition is satisfied.

6. The programmable controller according to claim 1, wherein
when sets of data to be stored upon a plurality of buffering conditions with different priorities being satisfied overlap with each other, the processing circuitry stores, into the buffer, a set of data corresponding to satisfaction of a buffering condition with a high priority in priority to a set of data corresponding to satisfaction of a buffering condition with a low priority, the priorities indicating priorities of storage of a set of data into the buffer.

7. The programmable controller according to claim 6, wherein the processing circuitry
receives a setting for assigning a priority to storage of a set of data for an earlier buffering condition being satisfied or assigning a priority to storage of a set of data for a later buffering condition being satisfied when sets of data to be stored upon a plurality of buffering conditions with equal priorities being satisfied overlap with each other, and
stores a set of data into the buffer based on the received setting.

8. The programmable controller according to claim 1, wherein
the buffering condition is a start condition for starting storage of a set of data into the buffer, and
the processing circuitry stores, into the buffer, the set of data indicating values collected during a first period having a predetermined length before the start condition is satisfied, a second period from when the start condition is satisfied to when an end condition for ending storage of the set of data into the buffer is satisfied, and a third period having a predetermined length after the end condition is satisfied.

9. The programmable controller according to claim 8, wherein the processing circuitry receives a setting for an upper limit of a size of a set of data to be stored into the buffer per satisfaction of the buffering condition, and stores, into the buffer, a set of data having a size smaller than or equal to the upper limit and included in the set of data indicating the values collected during the first period, the second period, and the third period.

10. The programmable controller according to claim 1, wherein the processing circuitry stores, into the buffer, a set of data indicating a difference between collected values.

11. The programmable controller according to claim 1, wherein the processing circuitry discards the set of data stored in the buffer without storing the set of data into the storage upon the other condition being satisfied.

12. The programmable controller according to claim 1, wherein the storage is different from the buffer.

13. The programmable controller according to claim 1, wherein the processing circuitry controls the device based on the value.

14. The programmable controller according to claim 1, wherein the programmable controller is part of a programmable logic controller system, the programmable logic controller system includes a display data generation device connected to the programmable controller via a communication line, the programmable logic controller system includes an electronic display device, the display data generation device is configured to generate display data for identifying a cause of trouble is from the log data, and the electronic display device is configured to displays a display screen for a user based on the generated display data.

15. The programmable controller according to claim 1, further comprising:

a display data generation device; and an electronic display device, wherein the display data generation device is configured to generate display data for identifying a cause of trouble is from the log data, and the electronic display device is configured to displays a display screen for a user based on the generated display data.

16. A data logging method to be executed by a programmable controller, the data logging method comprising:

repeatedly collecting, from a memory, a value that varies;

setting parameters;

storing, into a buffer, a set of data indicating the value collected at a timing corresponding to satisfaction of a buffering condition set as a parameter included in the parameters;

reading the set of data from the buffer upon a logging condition being satisfied and storing the set of data into a storage as a set of log data, the logging condition being set as a parameter included in the parameters; and discarding the set of data stored in the buffer upon another condition being satisfied, the other condition being different from the buffering condition and the logging condition and being set as a parameter included in the parameters.

17. A non-transitory recording medium storing a program, the program causing a programmable controller to perform operations comprising:

repeatedly collecting, from a memory, a value that varies;

setting parameters;

storing, into a buffer, a set of data indicating the value collected at a timing corresponding to satisfaction of a buffering condition set as a parameter included in the parameters;

reading the set of data from the buffer upon a logging condition being satisfied and storing the set of data into a storage as a set of log data, the logging condition being set as a parameter included in the parameters; and discarding the set of data stored in the buffer upon another condition being satisfied, the other condition being different from the buffering condition and the logging condition and being set as a parameter included in the parameters.

* * * * *